(12) United States Patent
Buckley et al.

(10) Patent No.: US 10,151,650 B2
(45) Date of Patent: Dec. 11, 2018

(54) TORQUE MEASUREMENT ASSEMBLIES

(71) Applicant: Honeywell International Inc., Morris Plains, NJ (US)

(72) Inventors: Mark C. Buckley, Camino, CA (US); Amar Nanda, Surrey (CA); Pascal Schweizer, Montbonnot (FR)

(73) Assignee: Honeywell International Inc., Morris Plains, NJ (US)

( * ) Notice: Subject to any disclaimer, the term of this patent is extended or adjusted under 35 U.S.C. 154(b) by 215 days.

(21) Appl. No.: 15/096,851

(22) Filed: Apr. 12, 2016

(65) Prior Publication Data

US 2017/0292878 A1    Oct. 12, 2017

(51) Int. Cl.
*G01L 3/10*    (2006.01)
*G01L 3/14*    (2006.01)

(52) U.S. Cl.
CPC .............. *G01L 3/101* (2013.01); *G01L 3/14* (2013.01)

(58) Field of Classification Search
CPC ....... G01L 3/1435; G01L 3/101; G01L 3/104; G01L 3/14; G01L 3/1407
See application file for complete search history.

(56) References Cited

U.S. PATENT DOCUMENTS

| | | | | |
|---|---|---|---|---|
| 5,065,633 A * | 11/1991 | Mercat | ............. | A61B 5/221 280/256 |
| 6,163,148 A * | 12/2000 | Takada | ............. | B62M 6/45 180/206.3 |
| 6,173,801 B1 * | 1/2001 | Kakutani | ............. | B62M 6/40 180/206.3 |
| 6,439,067 B1 * | 8/2002 | Goldman | ............. | B62M 6/45 73/862.333 |
| 6,851,497 B1 * | 2/2005 | Yoshiie | ............. | B62M 6/40 180/206.4 |
| 8,931,355 B2 | 1/2015 | Huang | | |
| 2004/0084272 A1 * | 5/2004 | Yoshiie | ............. | B62M 6/45 192/46 |
| 2005/0167226 A1 * | 8/2005 | Yoshiie | ............. | B62M 6/45 192/46 |
| 2009/0211374 A1 * | 8/2009 | Oike | ............. | G01D 5/145 73/862.08 |
| 2013/0075176 A1 * | 3/2013 | Chan | ............. | B62M 6/55 180/206.4 |
| 2014/0150569 A1 * | 6/2014 | Huang | ............. | B62M 6/50 73/862.333 |

(Continued)

*Primary Examiner* — Lisa Caputo
*Assistant Examiner* — Philip Cotey
(74) *Attorney, Agent, or Firm* — Craige Thompson; Thompson Patent Law

(57) ABSTRACT

A measurement assembly for determining a torque applied to a shaft including a disk coupled to a motor such that the motor is to drive rotation of the disk about a central axis. The measurement assembly also includes a first ring and second ring coupled to the disk and the shaft, respectively, and a sensor unit to measure a rotational displacement between the first and second rings about the central axis. The measurement assembly further includes one or more deformable members coupled between the disk and the shaft, each including a pair of ends and a body extending therebetween. For each deformable member, one of the ends is coupled to the shaft and the other end is coupled to the disk such that a rotation of the shaft relative to the disk about the central axis is to cause the deformation of the body.

20 Claims, 24 Drawing Sheets

(56) References Cited

U.S. PATENT DOCUMENTS

2014/0252923 A1 9/2014 Wang
2015/0137798 A1* 5/2015 Tanaka ................... G01D 5/142
                                                                     324/207.2

* cited by examiner

TORQUE MEASUREMENT ASSEMBLIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure generally relates to systems and assemblies for measuring the torque applied to a rotating shaft.

Various mechanical systems employ rotating shafts therein to accomplish a wide range of functions. Often, it is desirable to be able to measure the torque applied to such rotating shafts in order to better optimize performance, efficiency, and/or operational life of the mechanical system. One example of such a mechanical system is a drive system of a transportation device. In such devices, it is often desirable to accurately measure the torque applied to a rotating shaft contained therein from one specific source.

BRIEF SUMMARY

Some embodiments disclosed herein are directed to a torque measurement assembly for determining a torque applied to a shaft. In an embodiment, the torque measurement assembly includes a disk configured to be coupled to a motor such that the motor is configured to drive rotation of the disk about a central axis. In addition, the torque measurement assembly includes a first ring coupled to the disk, a second ring coupled to the shaft, and a sensor unit configured to measure a rotational displacement between the first ring and the second ring about the central axis. Further, the torque measurement assembly includes one or more deformable members coupled between the disk and the shaft, each deformable member including a pair of ends and a curved body extending between the pair of ends. For each deformable member, one of the pair of ends is coupled to the shaft and the other of the pair of ends is coupled to the disk such that a rotation of the shaft relative to the disk about the central axis is configured to cause the curved body to bend.

Other embodiments disclosed herein are directed to a measurement assembly. In an embodiment, the measurement assembly includes a disk that further includes a hub configured to be coupled to a shaft, an outer toothed section disposed about the hub, the outer toothed section configured to be coupled to a motor, and one or more deformable members extending between the outer toothed section and the hub. Rotation of the hub relative to the outer toothed section about the central axis causes deformation of the one or more deformable members. In addition, the measurement assembly includes a first ring coupled to the disk, a second ring coupled to the shaft, and a sensor unit configured to measure a rotational displacement of the first ring and the second ring about the central axis.

Still other embodiments disclosed herein are directed to a measurement assembly. In an embodiment, the measurement assembly includes a disk further including a plurality of teeth configured to be coupled to a motor such that the motor is configured to drive rotation of the disk about a central axis. In addition, the measurement assembly includes a first ring coupled to the disk, and a second ring coupled to a shaft. The first ring and the second ring each comprise a plurality of ferromagnetic teeth. The plurality of ferromagnetic teeth of the first magnetic ring and the plurality of ferromagnetic teeth of the second magnetic ring all extend through a single plane extending perpendicularly through the central axis. Further, the measurement assembly includes a sensor unit configured to measure a rotational displacement of the ferromagnetic teeth of the first ring relative to the plurality of ferromagnetic teeth of the second ring about the central axis. Still further, the measurement assembly includes one or more deformable members coupled to each of the disk and the shaft. Rotation of the shaft relative to the disk about the central axis causes deformation of the one or more deformable members.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 25 is a perspective view of another torque measurement ring arrangement for use within any of the torque measurement assemblies disclosed herein.

DETAILED DESCRIPTION

Figure 1:
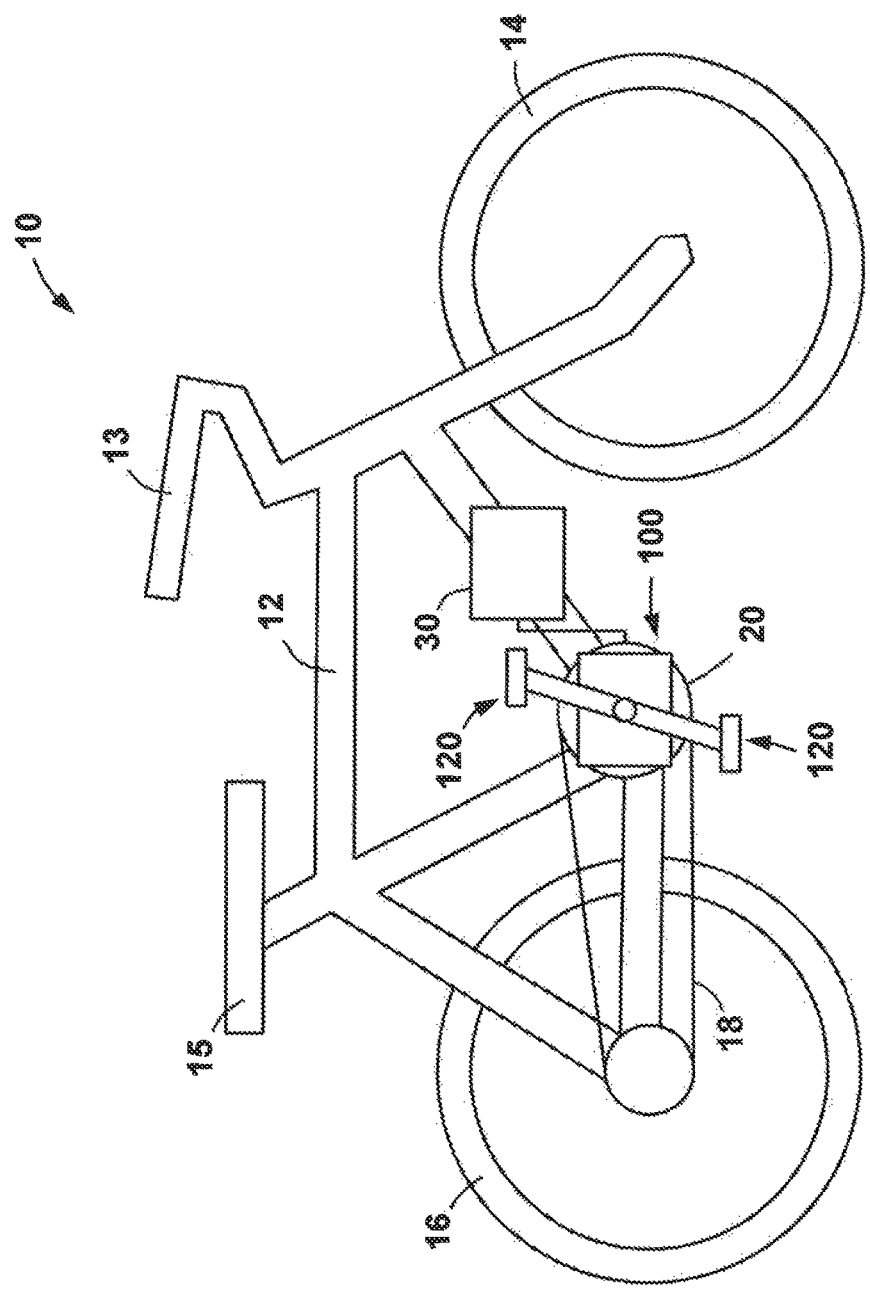
FIG. 1 is schematic view of a transportation device including a torque measurement assembly in accordance with at least some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, it is often desirable to accurately measure the torque applied to a rotating shaft of a mechanical system (e.g., the drive system of a transportation device) from a specific source. One example of such a system is the drive system of a motor-assisted bicycle (sometimes referred to as an electric bicycle or Ebike). Motor-assisted bicycles achieve locomotion both from the power provided by the rider via a set of pedals and via a motor (e.g., an electric motor). The drive system of such bicycles typically includes a controller which sets and controls the output of the motor based on some percentage of the torque and/or power provided by the rider with the pedals. Thus, in the drive systems of such motor-assisted bicycles, it is particularly desirable to be able to accurately measure the torque applied by the rider via the pedals in order to more accurately control the output of the motor during operation. Thus, embodiments disclosed herein include various torque measurement assemblies for accurately measuring the torque supplied to an input shaft of a drive system of a motor-assisted bicycle so as to improve the accuracy of such torque measurements in carrying out the motor control feature of such bicycles. It should be appreciated that while the embodiments disclosed herein are related specifically to the measurement of torque applied to an input shaft by a rider of a motor-assisted bicycle, the embodiments disclosed herein may be readily adapted to measure the torque applied to rotating shafts of other mechanical systems. Thus, the present disclosure should in no way be limited to the specific application of motor-assisted bicycles.

Referring now to FIG. 1, a transportation device 10 for providing motor-assisted locomotion to a user is shown. In this embodiment, transportation device 10 is a motor-assisted bicycle; however, it should be appreciated that transportation device 10 may be any suitable device or assembly configured to facilitate the transportation of a user. In at least some embodiments, transportation device 10 may be any suitable device or assembly which allows a user to manually provide at least a portion of the power required to drive locomotion during operations.

In this embodiment, transportation device 10 includes a frame 12, a steering handle 13, a seat 15, a front wheel 14, and a rear wheel 16. In addition, transportation device 10 includes a drive system 100 including a chain ring 20. Chain ring 20 is engaged with a drive chain 18 that is also engaged with rear wheel 16. As a result, during operations, drive system 100 drives rotation of rear wheel 16 via chain ring 20 and drive chain 18 thereby resulting in the locomotion of transportation device 10.

Figure 2:
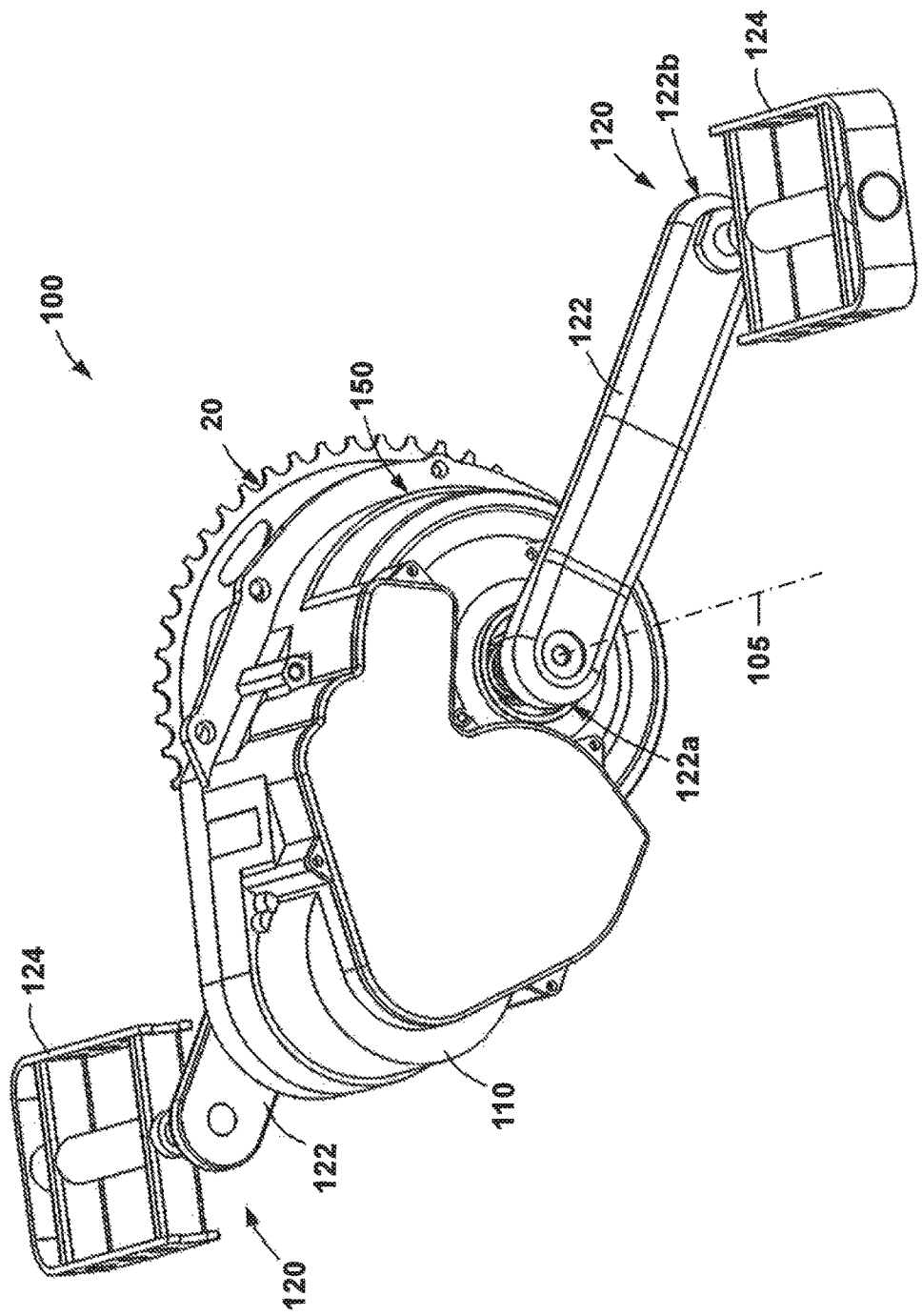
FIGS. 2-4 are perspective views of a drive system of the transportation device of FIG. 1.

Referring now to FIGS. 2-5, drive system 100 is shown independently of the other components of transportation device 10 (see FIG. 1). In addition to chain ring 20, in this embodiment, drive system 100 includes a central axis 105, a pair of pedal assemblies 120, a motor 140, a transmission 130, and a torque measurement assembly 150. As shown in FIG. 2, an outer covering or outer housing 110 covers each of the motor 140, transmission 130, and torque measurement assembly 150 (note: outer housing 110 is removed from view in FIGS. 3 and 4 to reveal motor 140, transmission 130, and assembly 150).

Transmission 130 includes one or more gears and/or other torque transfer devices or mechanisms (not shown). The specific layout of transmission 130 (particularly the torque transfer devices disposed therein) is outside the scope of the current disclosure; and thus, these details of transmission 130 are omitted herein in the interests of brevity. However, it should be appreciated that transmission 130 generally includes an input shaft 132 (see FIG. 5) that is aligned along central axis 105 and is coupled to the various torque transfer devices (not shown) mentioned above such that rotation of input shaft 132 about axis 105 facilitates and drives rotation of chain ring 20 about axis 105 (which thereby causes rotation rear wheel 16 and locomotion of transportation device 10 as described above—see FIG. 1). In some embodiments, transmission 130 is configured to transition between one of a finite number of distinct gear ratios for transmitting torque between input shaft 132 and chain ring 20. In other embodiments, transmission 130 may be a continuously variable transmission such as the NUVINCI® continuously variable transmission available from Fallbrook Technologies Inc. of Cedar Park, Tex.

Pedal assemblies 120 each include an elongate arm 122 having a first end 122a and a second end 122b opposite first end 122a. Arm 122 is coupled to input shaft 132 of transmission 130 at (or at least proximate to) first end 122a such that rotation of arm 122 about axis 105 facilitates and drives rotation of input shaft 132 about axis 105 as well. In addition, each pedal assembly 120 also includes a pedal 124 pivotably coupled to arm 122 at (or at least proximate to) second end 122b. Pedals 124 are configured to engage with the foot of a user during operations such that the user may drive rotation of arms 122 and thus input shaft 132 about axis 105.

Motor 140 is secured within outer housing 110 (see FIG. 1) adjacent to transmission 130 and torque measurement assembly 150. Motor 140 may comprise any suitable driver or driving mechanism configured to drive rotation of an output shaft. In this embodiment, motor 140 is an electric motor; however, in other embodiments, motor 140 may comprise a hydraulic motor, pneumatic motor, internal combustion engine, etc. Motor 140 includes an output shaft 142 that is engaged with an output gear 144. During operations, motor 140 is energized with electric current thereby driving rotation of output shaft 142 and output gear 144 about a central motor axis 145 that is parallel and radially offset from central axis 105.

Figure 3:
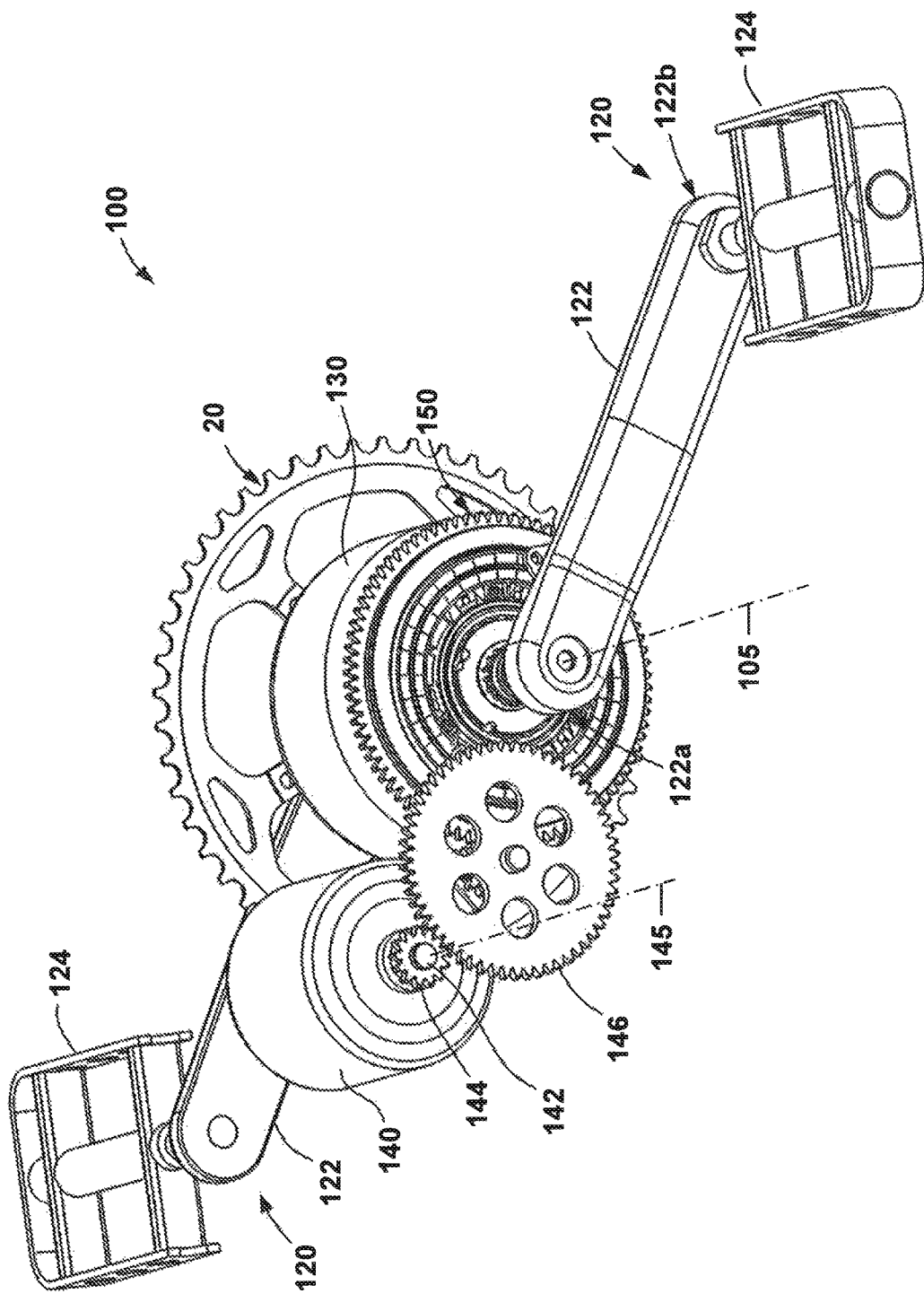
Figure 4:
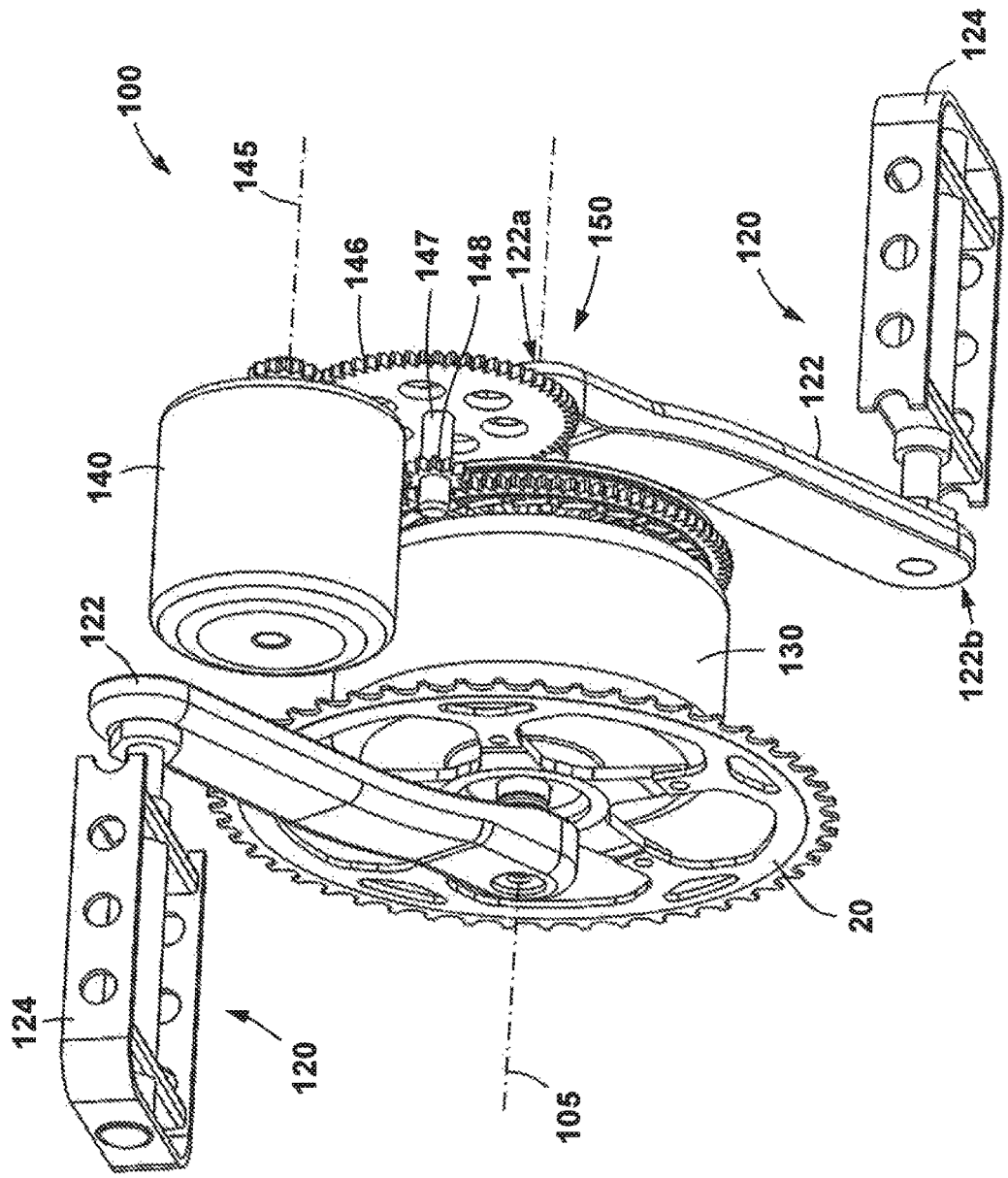

Referring still to FIGS. 2-4, although the details of torque measurement assembly 150 will be described in more detail below, it should be appreciated initially that motor 140 (particularly output shaft 142 and output gear 144) is operationally coupled to transmission 130 (particularly the torque transfer devices disposed therein) via the torque measurement assembly 150. Among other components (to be described in more detail below), torque measurement assembly 150 includes an input disk 152 including a plurality of teeth 154 (see FIG. 5). Input disk 152 is coaxially aligned with and coupled to input shaft 132 along axis 105, and thus, teeth 154 are evenly circumferentially spaced about axis 105. In addition, while not specifically shown, input disk 152 is engaged with the torque transfer devices (not shown) of transmission 130. For example, in some embodiments, input disk 152 is welded, bolted, or otherwise secured to one or more of the torque transfer devices (not shown) in transmission 130. As another example, in other embodiments, input disk 152 is coupled to one or more of the torque transfer devices (not shown) of transmission 130 via one or more bearings or other coupling devices configured to transfer torque from the input disk 152 to the one or more torque transfer devices (not shown) of transmission 130. Regardless of the specific engagement or coupling method used, during operations, rotation of input disk 152 about axis 105 facilitates the transfer of torque from input disk 152 to chain ring 20 via transmission 130 (particularly the torque transfer devices contained therein).

As best shown in FIGS. 3 and 4, output gear 144 is coupled to input disk 152 via a first transfer gear 146 and a second transfer gear 148. First transfer gear 146 is engaged with output gear 144 of motor 140, and second transfer gear 148 is engaged with input disk 152 (particularly with teeth 154). As best shown in FIG. 4, first transfer gear 146 and second transfer gear 148 are mounted to a common shaft 147 that extends generally parallel to each of the central axis 105 and motor axis 145. Accordingly, during operations, rotation of output gear 144 about motor axis 145 drives rotation of input disk 152 about axis 105 (which also drives rotation of chain ring 20 via transmission 130 as described above). In addition, because input shaft 132 is coupled to both input disk 152 and pedal assemblies 120 as previously described, input disk 152 may also be driven to rotate about axis 105 due to torque applied via pedal assemblies 120. Thus, input disk 152 (and thus also chain ring 20) may be driven to rotate both by motor 140 and pedal assemblies 120 during operations.

Referring now to FIGS. 1, 3, and 4, transportation device 10 also includes a controller 30 that is coupled to drive system 100 and is configured to, among other things, control the output (e.g., the torque output) of motor 140. As previously described, in at least some embodiments, controller 30 is configured to control the output of motor 140 based on the level or amount of torque applied to the input disk 152 via the pedal assemblies 120 and input shaft 132. As a result, torque measurement assembly 150 is arranged and configured to determine the torque applied to input disk via the pedal assemblies 120 alone (i.e., not including any torque applied to input disk 152 via the motor 140) to facilitate accurate control of motor 140 by controller 30 during operations.

Figure 5:
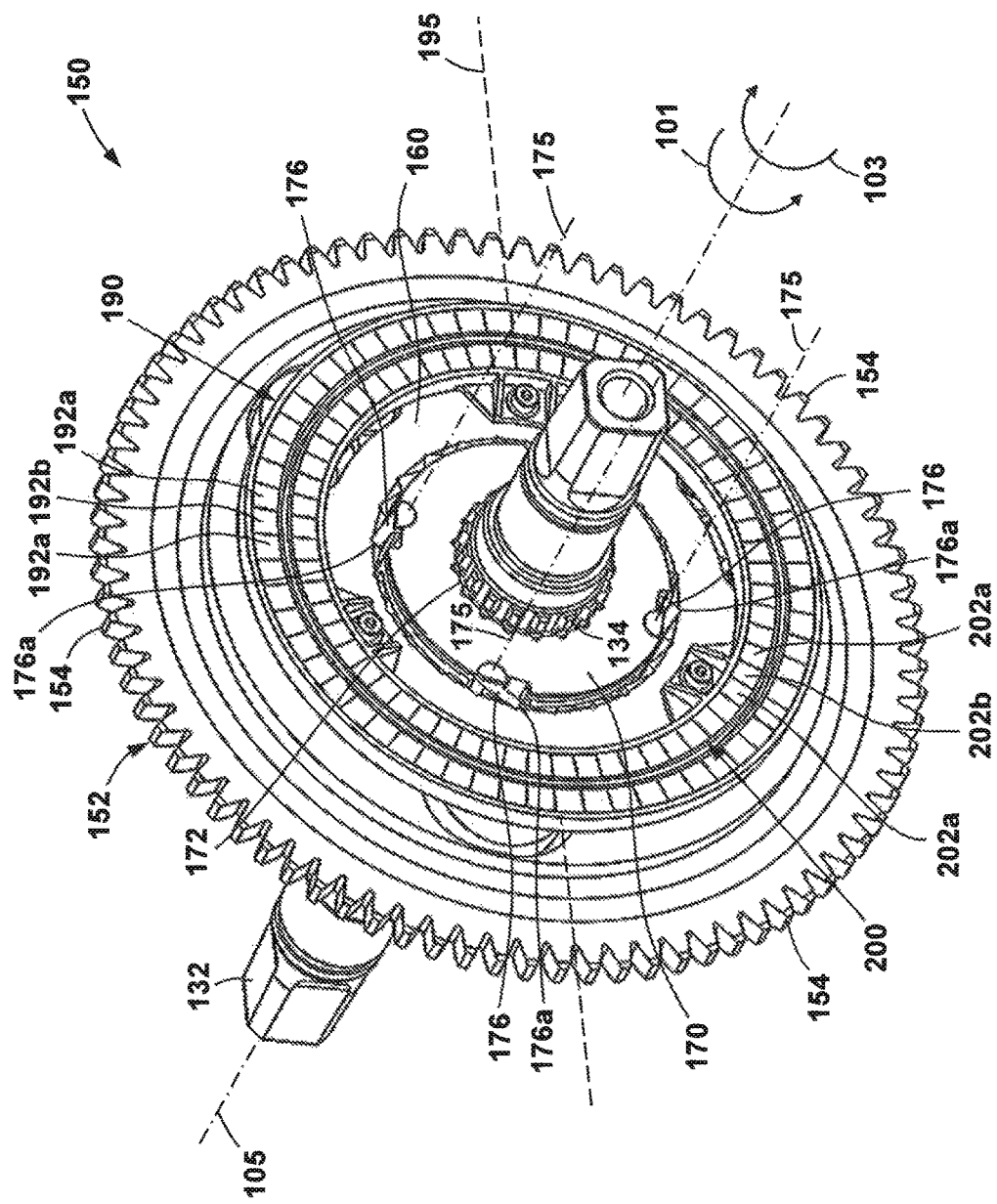
FIG. 5 is a perspective view of the torque measurement assembly for use within the transportation device of FIG. 1.
Figure 6:
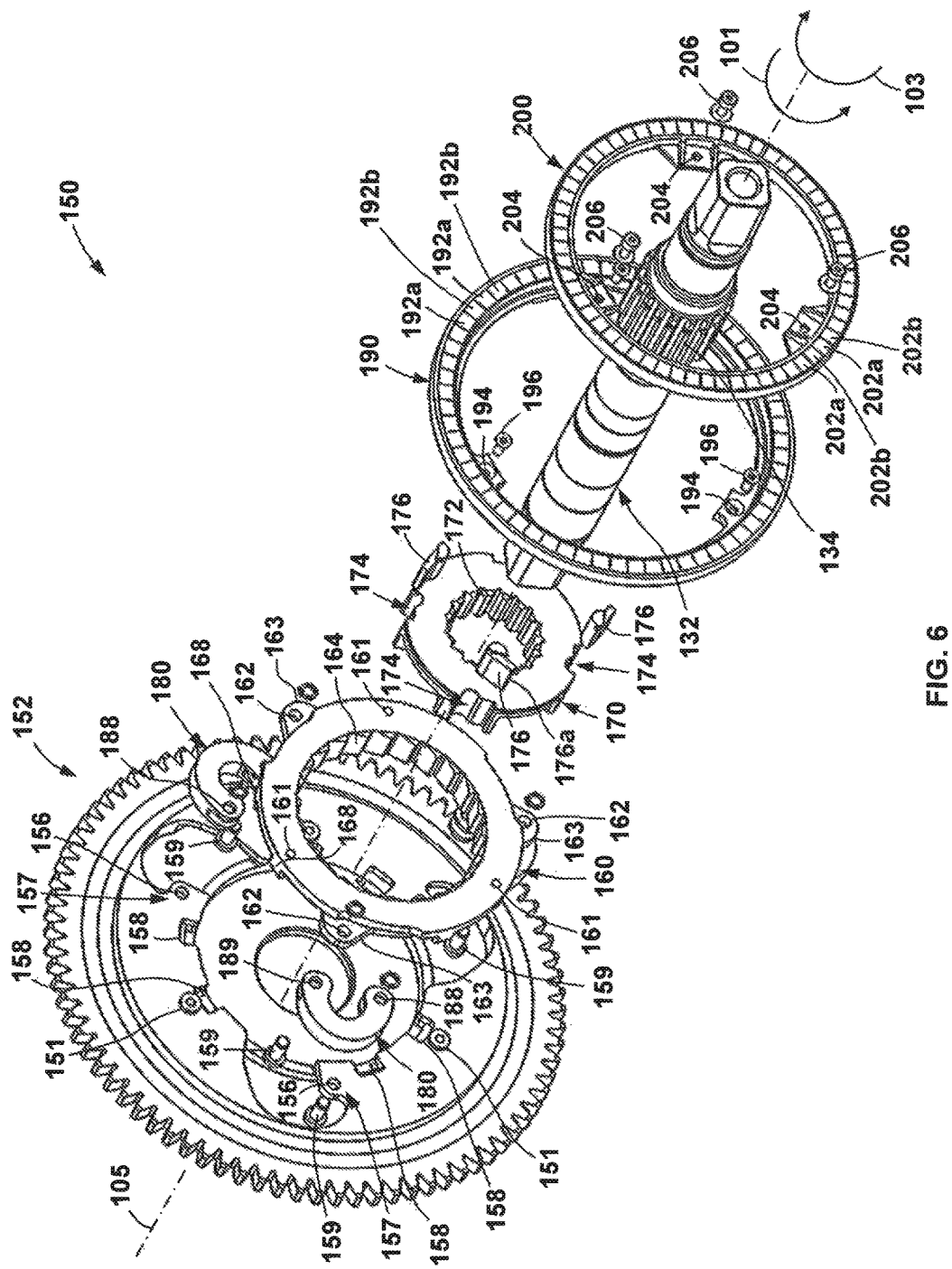
FIG. 6 is an exploded view of the torque measurement assembly of FIG. 5.

Referring now to FIGS. 5 and 6, torque measurement assembly 150 and input shaft 132 of transmission 130 (not shown) are shown independently of the other components of drive system 100 (see FIGS. 2-4). In addition to input disk 152, torque measurement assembly 150 includes a transfer ring 170, a ratchet ring 160, a plurality of deformable members 180, a first or outer ring 190, and a second or inner ring 200.

Transfer ring 170 is an annular ring-shaped member that includes a set or plurality of internal splines 172 disposed along an inner periphery thereof, and a plurality of outer recesses 174 circumferentially disposed about an outer perimeter or periphery thereof. Internal splines 172 are configured to mate and engage with a plurality of external splines 134 disposed about input shaft 132 thereby mating and securing transfer ring 170 to input shaft 132. As a result, when splines 172, 134 of transfer ring 170 and input shaft 132, respectively, are engaged (e.g., as shown in FIG. 5), transfer ring 170 is rotationally coupled to input shaft 132 such that transfer ring 170 and input shaft 132 rotate together about axis 105 during operations. Recesses 174 each pivotably receive a pawl 176 therein such that each pawl 176, once received and seated within one of the recesses 174, may rotate or pivot about a corresponding axis 175 relative to transfer ring 170. Each axis 175 is parallel to and radially offset from central axis 105. In addition, in this embodiment, each pawl 176 is rotationally biased within the corresponding recess 174 about the corresponding axis 175 such that a leading end 176a of pawl 176 is rotationally biased away (e.g., radially away) or out of recess 174. Pawls 176 may be rotationally biased in any suitable manner, such as, for example, one or more springs (e.g., coiled springs, leaf springs, torsional springs, etc.).

Ratchet ring 160 is an annular ring-shaped member that includes a set or plurality of internal ratchet teeth 164 disposed along an inner periphery of ratchet ring 160, and a plurality of mounting projections 163, disposed about an outer perimeter or periphery of ratchet ring 160. Each mounting projection 163 includes a corresponding mounting aperture 162 extending axially therethrough. As will be described in more detail below, mounting apertures 162 are utilized to couple ratchet ring 160 to input disk 152 during operations.

As best shown in FIG. 5, transfer ring 170 is disposed about input shaft 132 such that splines 172, 134 mate with one another in the manner described above. Thereafter, pawls 176 are pivotably engaged within recesses 174 on transfer ring 170, and input shaft 132 and transfer ring 170 are each received within ratchet ring 160 such that pawls 176 are engaged with internal ratchet teeth 164 on ratchet ring 160. The engagement between pawls 176 and ratchet teeth 164 is further facilitated by the rotational bias (previously described) of pawls 176 within recesses 174. As can be appreciated from FIGS. 5 and 6, pawls 176 and ratchet teeth 164 are configured, shaped, arranged, and oriented such that a rotation of input shaft 132 (e.g., as driven by pedal assemblies 120 as previously described) in a first direction 101 (counter-clockwise in the views of FIGS. 5 and 6) about axis 105 causes leading ends 176a of pawls 176 to engage and abut against ratchet teeth 164 such that torque is transferred from input shaft 132 to ratchet ring 160 about axis 105. Conversely, as can also be appreciated from FIGS. 5 and 6, pawls 176 and ratchet teeth 164 are configured, shaped, arranged, and oriented such that a rotation of input shaft 132 (e.g., as driven by pedal assemblies 120 as previously described) in a second direction 103 (clockwise in the views of FIGS. 5 and 6 and being opposite first direction 101) about axis 105 causes pawls 176 to slidingly engage ratchet teeth 164 such that no torque is transferred from input shaft 132 to ratchet ring 160 about axis 105 (i.e., so that input shaft 132 and transfer ring 170 may rotate relative to ratchet ring 160 about axis 105).

Referring still to FIGS. 5 and 6, ratchet ring 160 is coupled to input disk 152 via a plurality of deformable members 180 such that ratchet ring 160 may transfer torque about axis 105 to input disk 152, and such that ratchet ring 160 may rotate about axis 105 relative to input disk 152 by some amount. In at least some embodiments, the deformable members 180 are configured to allow a relative rotation between ratchet ring 160 and input disk 152 of approximately 4° or less, and in other embodiments, the deformable members 180 are configured to allow a relative rotation between ratchet ring 160 and input disk 152 of approximately 2° or less. However, it should be appreciated that other relative rotational amounts are possible in other embodiments. In this embodiment, the maximum rotational displacement of ratchet ring 160 relative to input disk 152 is set by the engagement of a plurality of axially oriented projections 168 on ratchet ring 160 and a plurality of corresponding slots or recesses 158 in input disk 152 (see FIG. 6).

Figure 7:
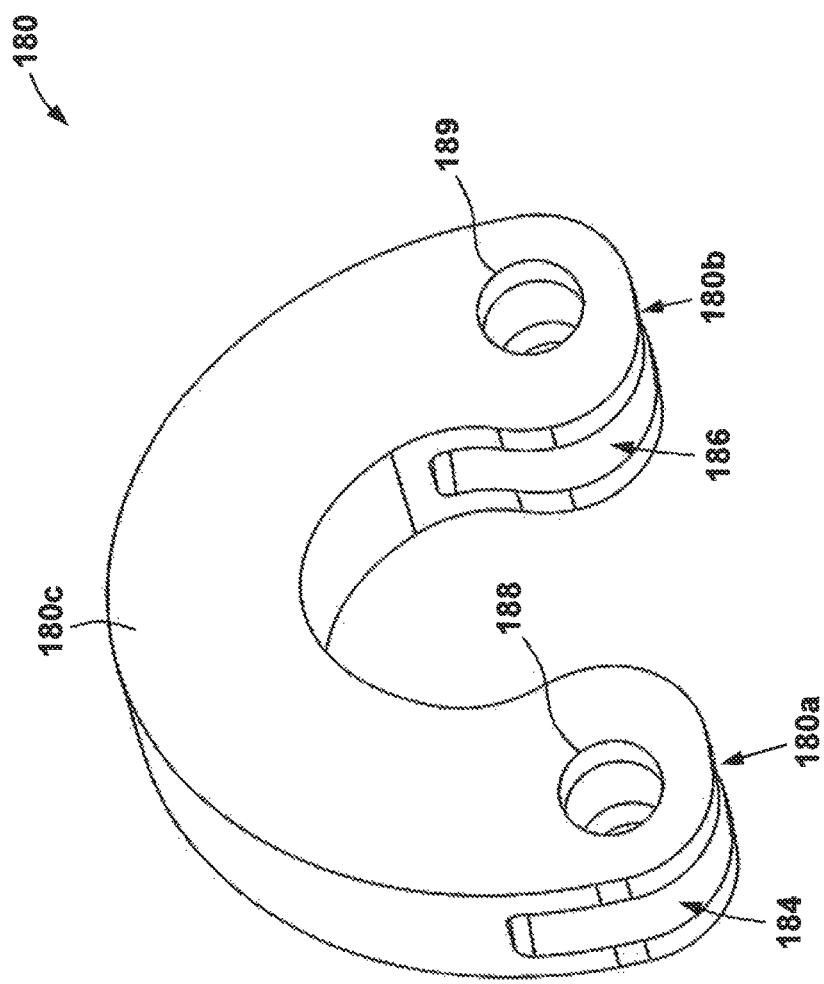
FIG. 7 is a perspective view of one of the deformable members of the torque measurement assembly of FIG. 5.

Referring now to FIG. 7, each deformable member 180 includes a first end 180a, a second end 180b, and a curved body 180c extending between ends 180a, 180b. Curved body 180c is generally U-shaped such that ends 180a, 180b are placed proximate to one another. A first mounting slot 184 extends into deformable member 180 from first end 180a, and a second mounting slot 186 extends into deformable member 180 from second end 180b. Also, a first mounting aperture 188 extends through deformable member 180 and through first mounting slot 184 at first end 180a, and a second mounting aperture 189 extends through deformable member 180 and second mounting slot 186 at second end 180b. Deformable members 180 may comprise any suitable, compliant (or semi-compliant) material that may be elastically deformed when subjected to an external load, such as, for example, rubber (natural or synthetic), a polymer, and/or a metal. In this embodiment, deformable members 180 comprise steel. In addition, in this embodiment, deformable members 180 are sufficiently rigid so as to bias ends 180a, 180b apart from one another. Thus, each of the deformable members 180 may have a spring constant $K_{180}$ that is known or determinable by one of ordinary skill.

Figure 8:
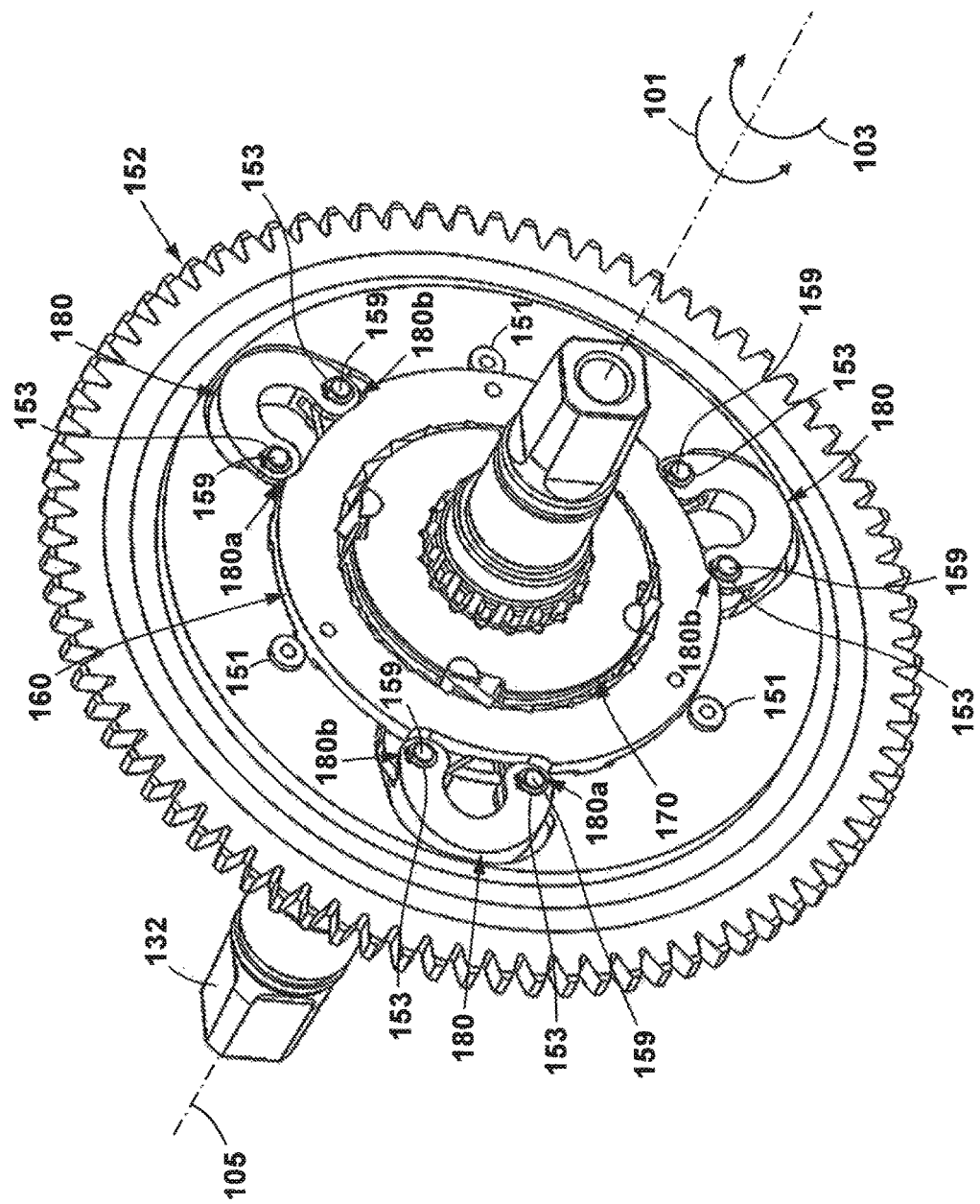
FIG. 8 is another perspective view of the torque measurement assembly of FIG. 5.

Referring now to FIGS. 6-8, each deformable member 180 is mounted to input disk 152 by inserting a corresponding mounting projection 157 on input disk 152 within first mounting slot 184 and aligning a mounting aperture 156 on mounting projection 157 with first mounting aperture 188 on deformable member 180. Thereafter, a pin 159 or other suitable mounting member (e.g., nail, screw, rivet, etc.) is inserted through the aligned apertures 156, 188 on input disk 152 and deformable member 180, respectively. Thus, because there are a plurality of deformable members 180, input disk 152 includes a plurality of mounting projections 157 (each including a corresponding mounting aperture 156) circumferentially disposed about axis 105. In addition, each deformable member 180 is mounted to ratchet ring 160 by inserting one of the mounting projections 163 on ratchet ring 160 into second mounting slot 186 and aligning mounting aperture 162 on projection 163 with second mounting aperture 189 in deformable member 180. Thereafter, a pin 159 or other suitable mounting member (e.g., nail, screw, rivet, etc.) is inserted through the aligned apertures 162, 189 on ratchet ring 160 and deformable member 180, respectively. Once pins 159 are inserted within the aligned apertures 156, 188 and aligned apertures 162, 189 as described above, a locking ring 153 is disposed about each pin 159 to thereby secure pins 159 within apertures 156, 188 and apertures 162, 189. In this embodiment, there are total of three (3) deformable members 180, and thus, input disk 152 includes a total of three (3) mounting projections 157 and apertures 156, and ratchet ring 160 includes a total of three (3) mounting projections 163 and apertures 162. Each of the mounting projections 157 and apertures 156 are circumferentially spaced approximately 120° about axis 105, and each of the mounting projections 163 and apertures 162 are circumferentially spaced approximately 120° about axis 105.

During operations, a rotation of ratchet ring 160 relative to input disk 152 along the first direction 101 will cause the curved body 180c of each deformable member 180 to bend thereby forcing the ends 180a, 180b of each deformable member circumferentially toward one another about axis 105. Because each deformable member 180 is configured to bias their corresponding ends 180a, 180b circumferentially apart from one another (relative to the spring constant $K_{180}$, previously described), the bending of bodies 180c of deformable members 180 described above results in a biasing force being applied to input disk 152 and ratchet ring 160 to rotationally urge ratchet ring 160 to rotate back along the second direction 103 to place each of the deformable members 180 in a substantially neutral position or state (i.e., where no or substantially no biasing force is applied by members 180 to input disk 152 and ratchet ring 160). Thus, when torque is no longer applied to input shaft 132 via pedal assemblies 120, ratchet ring 160 rotates back along direction 103 by the biasing force applied by deformable members 180 to return to a neutral position relative to input disk 152.

Referring again to FIGS. 5 and 6, as previously described, torque measurement assembly 150 also includes the first or outer ring 190 and the second or inner ring 200. In this embodiment, each ring 190, 200 is a single multi-pole ring magnet that includes a plurality of alternating and opposite poles. Specifically, outer ring 190 includes a plurality of first regions or sections 192a having a first polarity, and a plurality of second regions or sections 192*b* having a second polarity that is opposite the first polarity. Similarly, inner ring 200 includes a plurality of third regions or sections 202*a* having the first polarity, and a plurality of fourth regions or sections 202*b* having the second polarity. Each of the first plurality of sections 192*a* on outer ring 190 are circumferentially arranged adjacent and between a pair of the second plurality of sections 192*b*, and each of the third plurality of sections 202*a* on inner ring 200 are circumferentially arranged adjacent and between a pair of the fourth plurality of sections 202*b*.

In other embodiments, rings 190, 200 may each include a multi-pole ring that includes a plurality of magnets having alternating and opposite polarities (rather than a single magnet having sections of opposite polarities). Specifically, in these embodiments, sections 192*a*, 192*b* on ring 190 would represent separate, independent magnets having opposing and alternating polarities as discussed above. Similarly, in these embodiments, sections 202*a*, 202*b* on ring 200 would represent separate, independent magnets having opposing and alternating polarities as discussed above. The performance and function of rings 190, 200 discussed herein is the same regardless as to whether rings 190, 200 are formed of single magnets having sections of opposite and alternating polarities, or whether rings 190, 200 are formed of a plurality of circumferentially arranged magnets of opposite and alternating polarities.

Outer ring 190 includes a plurality of mounting apertures 194 that are each alignable with a corresponding mounting aperture 151 extending axially through input disk 152. A screw 196 or other suitable coupling member (e.g., nail, bolt, rivet, pin, etc.) is inserted through the aligned apertures 194, 151, to thereby secure outer ring 190 to input disk 152. Inner ring 200 includes a plurality of mounting apertures 204 that are each alignable with a corresponding mounting aperture 161 extending through ratchet ring 160. A screw 206 or other coupling member (e.g., nail, bolt, rivet, pin, etc.) is inserted through the aligned apertures 204, 161, to thereby secure inner ring 200 to ratchet ring 160. Thus, with outer ring 190 mounted to input disk 152 and inner ring 200 mounted to ratchet ring 160, it should be appreciated that rotation of ratchet ring 160 relative to input disk 152 as described above also results in rotation of inner ring 200 relative to outer ring 190 about axis 105. In addition, as can be appreciated from FIG. 5, when torque measurement assembly 150 is fully assembled, with outer ring 190 mounted to input disk 152 and inner ring 200 mounted to ratchet ring 160, each of the rings 190, 200 are disposed within a common plane (e.g., the plane including line segment 195 shown in FIG. 5) that extends perpendicularly through axis 105.

Figure 9:
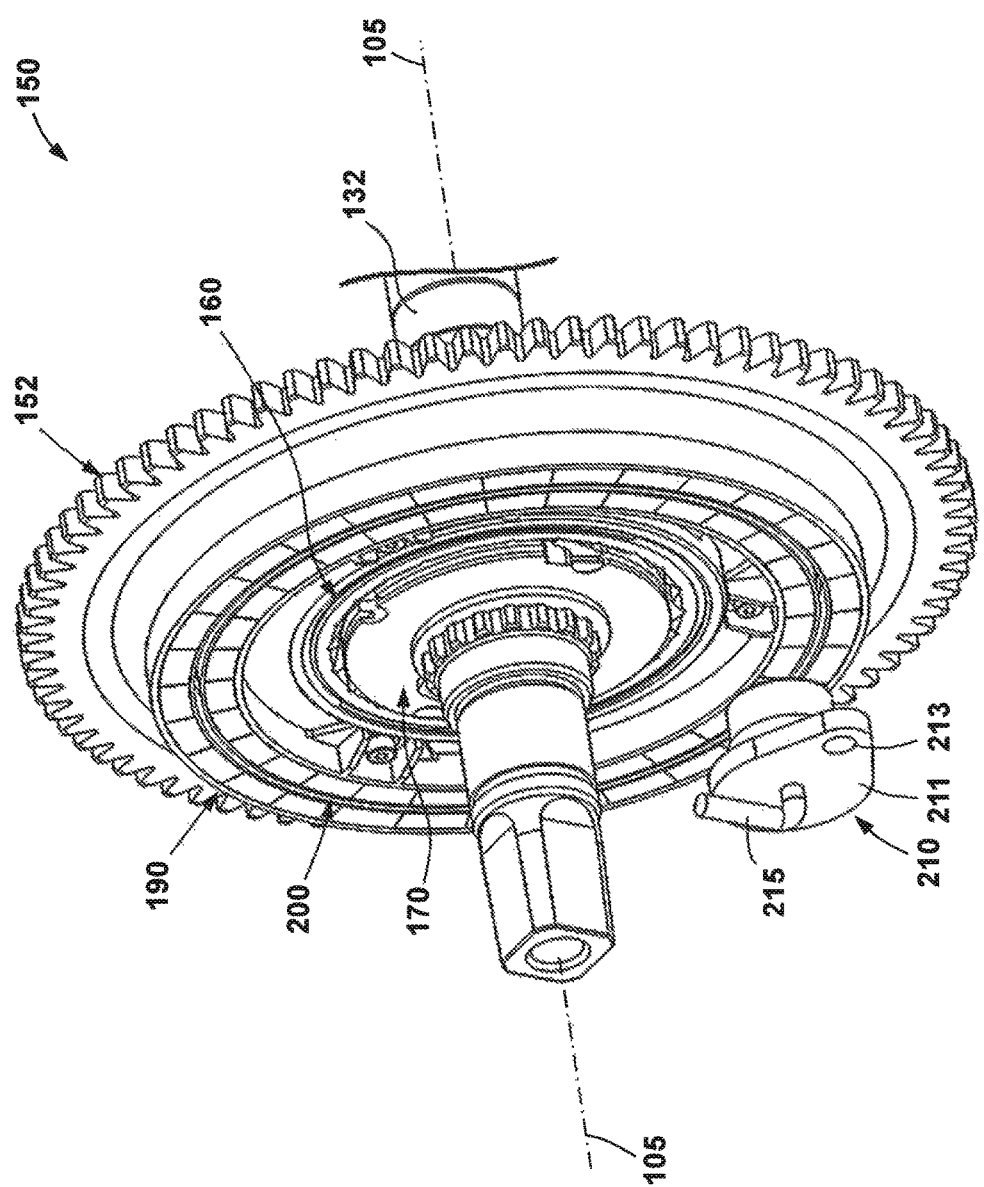
FIG. 9 is another perspective view of the torque measurement assembly of FIG. 5 showing a sensor unit for measuring the relative rotational displacement of a first ring and a second ring.

Referring now to FIGS. 8 and 9, when rings 190, 200 are mounted to input disk 152 and ratchet ring 160 as described above, and when each of the deformable members 180 are placed in a neutral position or state (i.e., ratchet ring 160 is not rotated relative to input disk 152 such that deformable members 180 are generally not deformed and do not exert a circumferential biasing force on input disk 152 and/or ratchet ring 160), the first plurality of sections 192*a* on outer ring 190 are circumferentially aligned with the third plurality of sections 202*a* on inner ring 200. Accordingly, when each of the deformable members 180 are placed in a neutral position or state, the second plurality of sections 192*b* on outer ring 190 are circumferentially aligned with the fourth plurality of sections 202*b* on inner ring 200. Therefore, a rotation of ratchet ring 160 relative to input disk 152, in addition to causing deformation of deformable members 180 in the manner described above, also causes circumferential misalignment between the first plurality of sections 192*a* on outer ring 190 and the third plurality of sections 202*a* on inner ring 200, and between the second plurality of sections 192*b* on outer ring 190 and the fourth plurality of sections 202*b* on inner ring 200.

Figure 10:
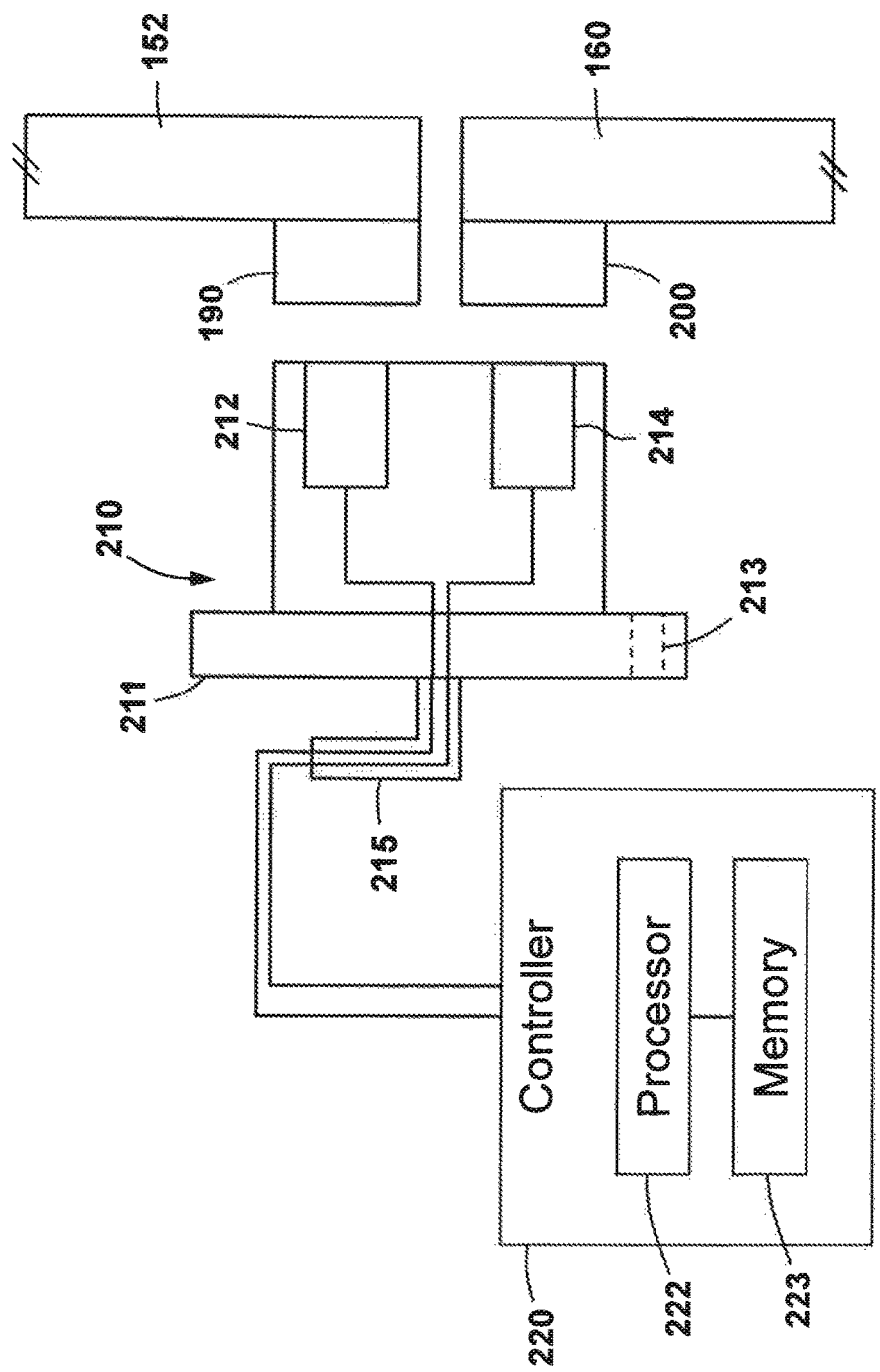
FIG. 10 is a schematic view of the sensor unit, first ring, and second ring of the torque measurement assembly of FIG. 5.

Referring now to FIGS. 9 and 10, torque measurement assembly 150 also includes a sensor unit 210 mounted adjacent to outer ring 190 and inner ring 200. Sensor unit 210 includes a pair of Hall effect sensors, with one Hall effect sensor 212 being axially aligned with the sections 192*a*, 192*b* of outer ring 190 and the other Hall effect sensor 214 being axially aligned with the inner ring 200. Each of the Hall effect sensors 212, 214 are electrically coupled to a controller 220 (which may be disposed outside sensor unit 210 as schematically shown in FIGS. 9 and 10 or inside sensor unit 210 in other embodiments). While sensors 212, 214 have been described as Hall effect sensors, it should be appreciated that sensors 212, 214 may be any suitable sensor technology such as, for example, magneto resistance, tunneling magneto resistance, giant magneto resistance, etc.

Sensor unit 210 includes a mounting flange 211 including a mounting aperture 213 for mounting sensor unit 210 adjacent to rings 190, 200. In at least some embodiments, mounting aperture 213 in mounting flange 211 is aligned with a corresponding mounting aperture on an inner surface of outer housing 110 (see FIG. 2), such that a coupling member (e.g., screw, bolt, rivet, nail, pin, etc.) may be inserted therethrough to secure sensor unit 210 to outer housing 110. In addition, in this embodiment, sensor unit 210 includes a wiring harness 215 that carries one or more electrical conductors coupled to sensors 212, 214 and/or controller 220.

Figure 11:
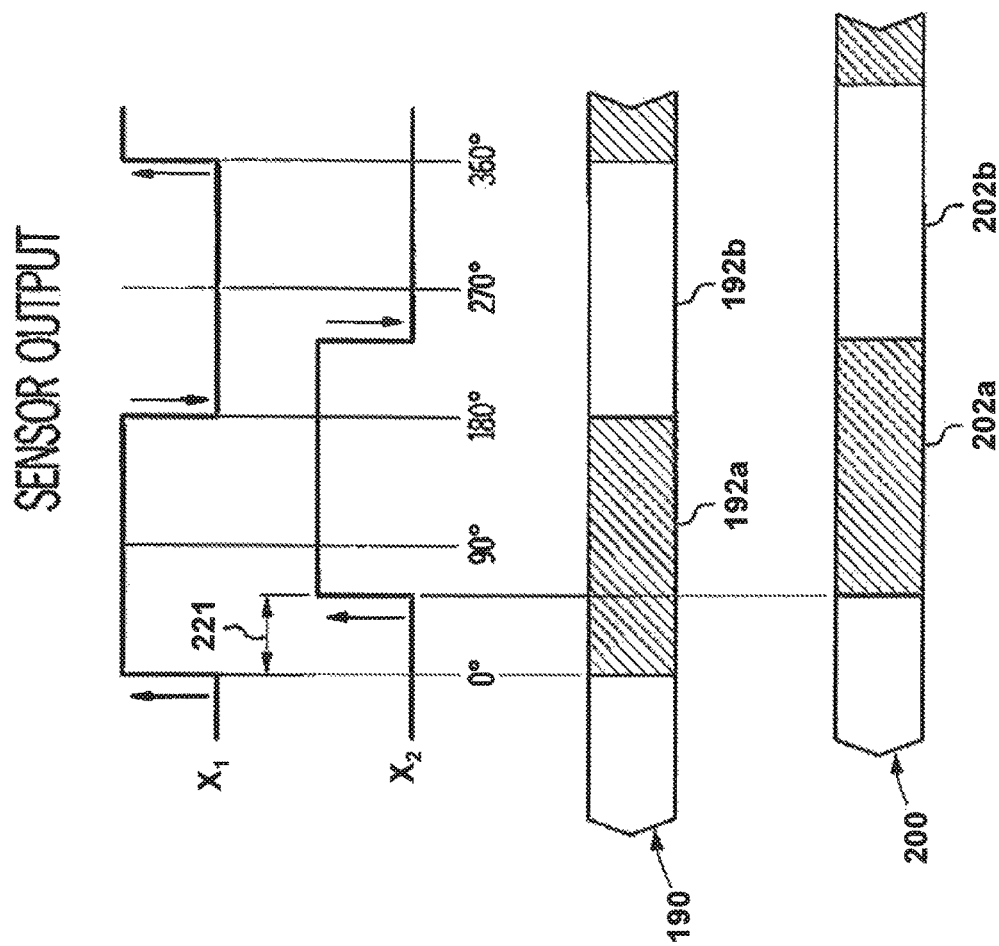
FIG. 11 is a schematic showing the periodic signals observed by the sensors of the sensor unit of FIGS. 9 and 10.

Referring now to FIGS. 9-11, during operations, sensors 212, 214 observe and generate two periodic signals $X_1$ and $X_2$, respectively, of the magnetic field surrounding the rings 190, 200, respectively, during the rotation of the input disk 152, ratchet ring 160, transfer ring 170, and input shaft 132 about axis 105. If input shaft 132 and ratchet ring 160 rotate about axis 105 relative to input disk 152 in the manner described above (e.g., such that deformable members 180 are deformed as previously described), the periodic signal $X_2$ generated from the sensor 214 (which is aligned with the inner ring 200) is shifted compared to the periodic signal $X_1$ generated from the sensor 212 (which is aligned with the outer ring 190). As illustrated in FIG. 11, a measure of a phase shift 221 between the two periodic signals $X_1$ and $X_2$ generated by the sensors 212, 214, respectively, is a direct measure of the rotational angle shift between the ratchet ring 160, transfer ring 170, input shaft 132, and the input disk 152 about axis 105. This measured rotational angle shift is directly proportional to the torque applied to the input shaft 132 (e.g., via pedal assemblies 120). For example, without being limited by this or any other theory, the measured rotational angle shift and torque applied to input shaft 132 are related by the spring constants $K_{180}$ of the deformable members 180.

Controller 220 may include at least a processor 222 and a memory 223. The memory 223 may include software for execution on processor 222. Once a phase shift 221 is measured by sensors 212, 214, processor 222 may calculate (e.g., via a look up, calibration table, direct calculation, or some combination thereof) the torque applied to shaft 132. In some embodiments, controller 220 may then communicate the determined torque to another controller (e.g., controller 30) for controlling some other aspect or component of transportation device 10 (see FIG. 1). For example, in some embodiments, the determined torque may be communicated to controller 30 (see FIG. 1) which then controls the torque output of motor 140 as previously described. In still other embodiments, controller 220 may both perform the torque determination calculation described above and control some other aspect or component (e.g., torque output of motor 140) of transportation device 10 as a result thereof.

While embodiments disclosed herein have included one or more deformable members 180 for allowing for relative rotation between input shaft 132 and input disk 152, it should be appreciated that various other methods and devices may be employed to accomplish this relative rotation in other embodiments. For example, referring now to FIG. 12, another embodiment of torque measurement assembly 250 is shown with input shaft 132 but otherwise independent of other components of transportation device 10 (see FIG. 1). Torque measurement assembly 250 is substantially similar to torque measurement assembly 150 (see FIGS. 5 and 6), and thus, like components are identified with like reference numerals, and the description below will focus on the components and features of torque measurement assembly 250 that are different from torque measurement assembly 150.

Figure 12:
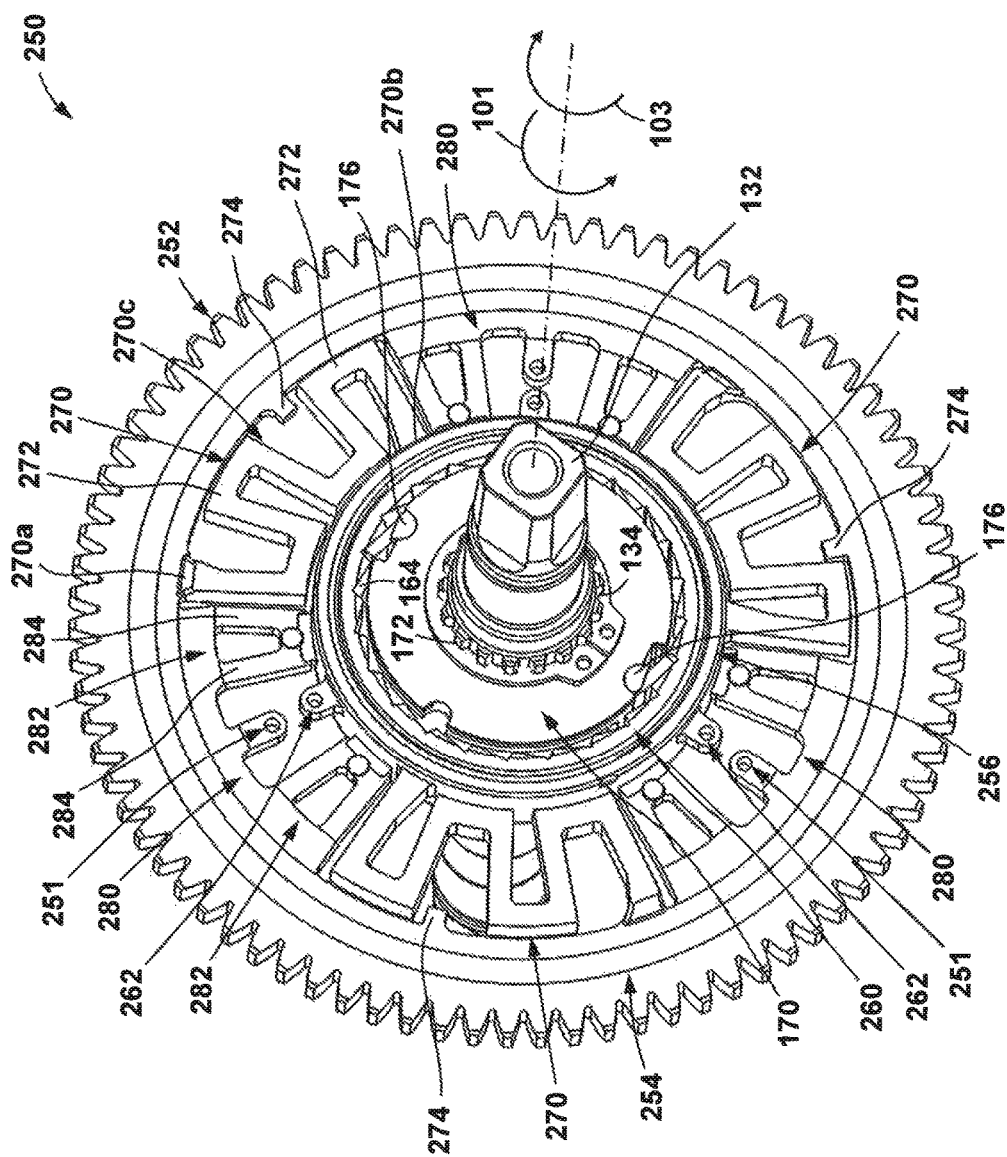
FIG. 12 is a perspective view of another torque measurement assembly for use within the transportation device of FIG. 1 in accordance with at least some embodiments.

As shown in FIG. 12, torque measurement assembly 250 includes an input disk 252 in place of input disk 152 (see FIGS. 5 and 6), and a ratchet ring 260 in place of ratchet ring 160 (see FIGS. 5 and 6). In addition, torque measurement assembly 250 includes transfer ring 170 (previously described). Further, while not specifically shown, torque measurement assembly 250 also includes outer and inner rings 190, 200 and sensor unit 210 shown and described above for torque measurement assembly 150. These components (i.e., rings 190, 200, and sensor unit 210) are not shown on torque measurement assembly 250 in FIG. 12 to better show input disk 252 and ratchet ring 260, and so as not to unduly complicate the figure.

Figure 13:
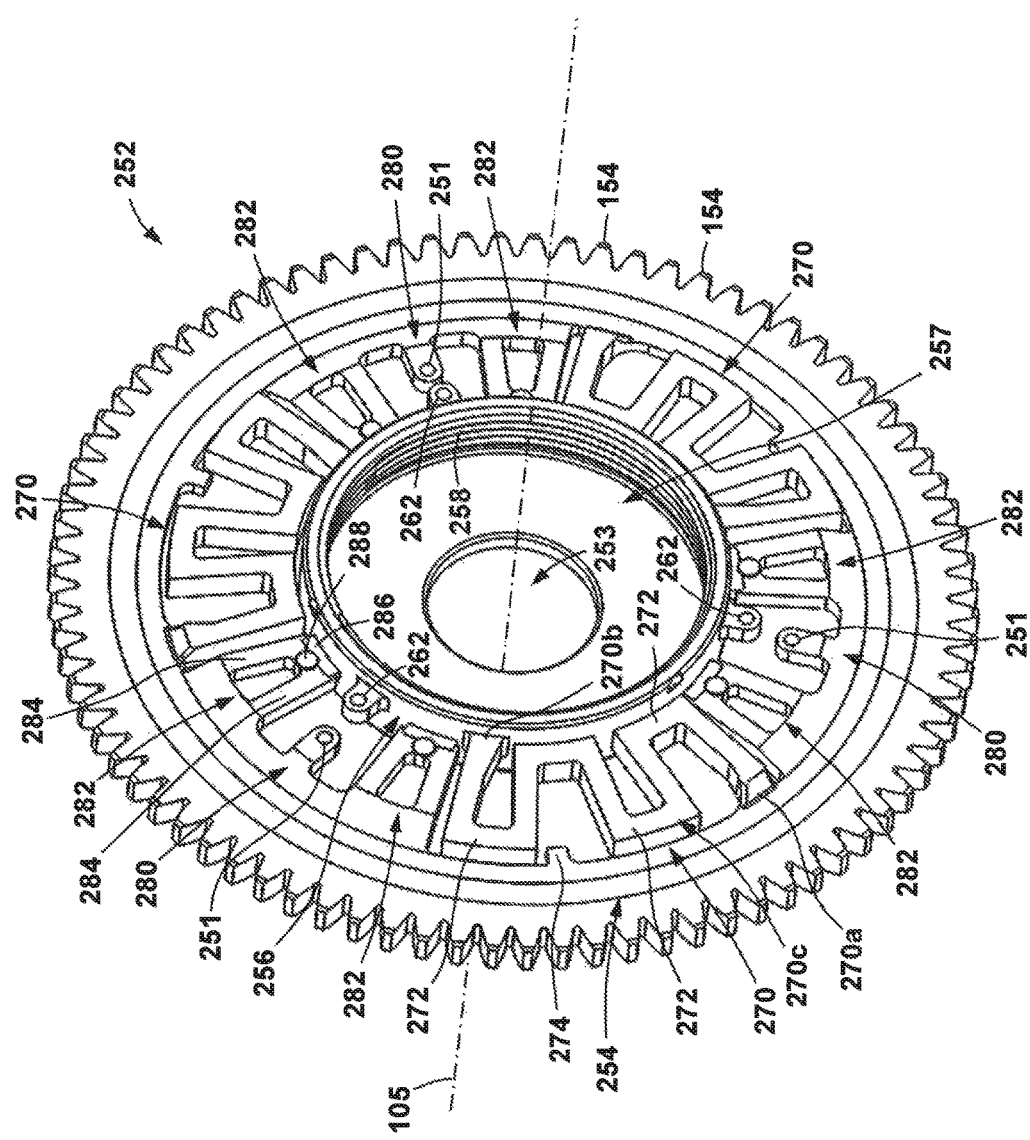
FIG. 13 is a perspective view of the input disk of the torque measurement assembly of FIG. 12.

Referring now to FIGS. 12 and 13, input disk 252 includes an outer toothed section 254 and a hub 256 disposed concentrically within the outer toothed section 254. Outer toothed section 254 is an annular member that includes the plurality of teeth 154 which, as previously described above, engage with the second transfer gear 148 (see FIG. 4). Hub 256 is an annular member that includes an axially extending cylindrical receptacle 257 having a set of female threads 258 therein, and an axially extending central aperture 253.

Input disk 252 also includes a plurality of deformable members 270 engaged with and extending between outer toothed section 254 and hub 256 that allow for some amount of relative rotation between outer toothed section 254 and hub 256 about axis 105 during operations. Specifically, each deformable member 270 includes a first end 270a secured to outer toothed section 254, a second end 270b secured to hub 256, and an elongate body 270c extending between ends 270a, 270b. Body 270c of each deformable member 270 is configured to deform circumferentially to allow the ends 270a, 270b to move circumferentially toward and apart from one another during operations. In particular, in this embodiment, body 270c of each deformable member 270 is formed in a wave shape including a plurality of bends 272 that facilitate circumferential compression of deformable members 270 (e.g., when a torque is applied to hub 256 about axis 105). In this embodiment, deformable members 270 are sufficiently rigid so as to bias ends 270a, 270b circumferentially apart from one another. Thus, each of the deformable members 270 may have a spring constant $K_{270}$ that is known or determinable by one of ordinary skill.

Outer toothed section 254 also includes a plurality of radially oriented stops 274 extending radially inward from outer toothed section 254 and circumferentially positioned adjacent to the bends 272 of deformable members 270. During operations, stops 274 limit circumferential compression of deformable members 270 by engaging or abutting deformable members 270 when some maximum circumferential compression is achieved. As a result, stops 274 act to limit relative rotation of hub 256 and outer toothed section 254 during operations. In at least some embodiments, stops 274 are positioned to allow a relative rotation between hub 256 and outer toothed section 254 of 4° or less. In other embodiments, stops 274 are positioned to allow a relative rotation between hub 256 and outer toothed section 254 of 2° or less.

In some embodiments, deformable members 270 are separate and independent components that are secured (e.g., via welding, adhesive, bolts, rivets, pins, etc.) to outer toothed section 254 and hub 256. However, in this embodiment, deformable members 270 are integrally formed with each of the outer toothed section 254 and hub 256. Specifically, outer toothed section 254, hub 256, and deformable member 270 are all machined (which may include forging, casting, milling, etc.) or otherwise formed out of a single piece of material.

Figure 14:
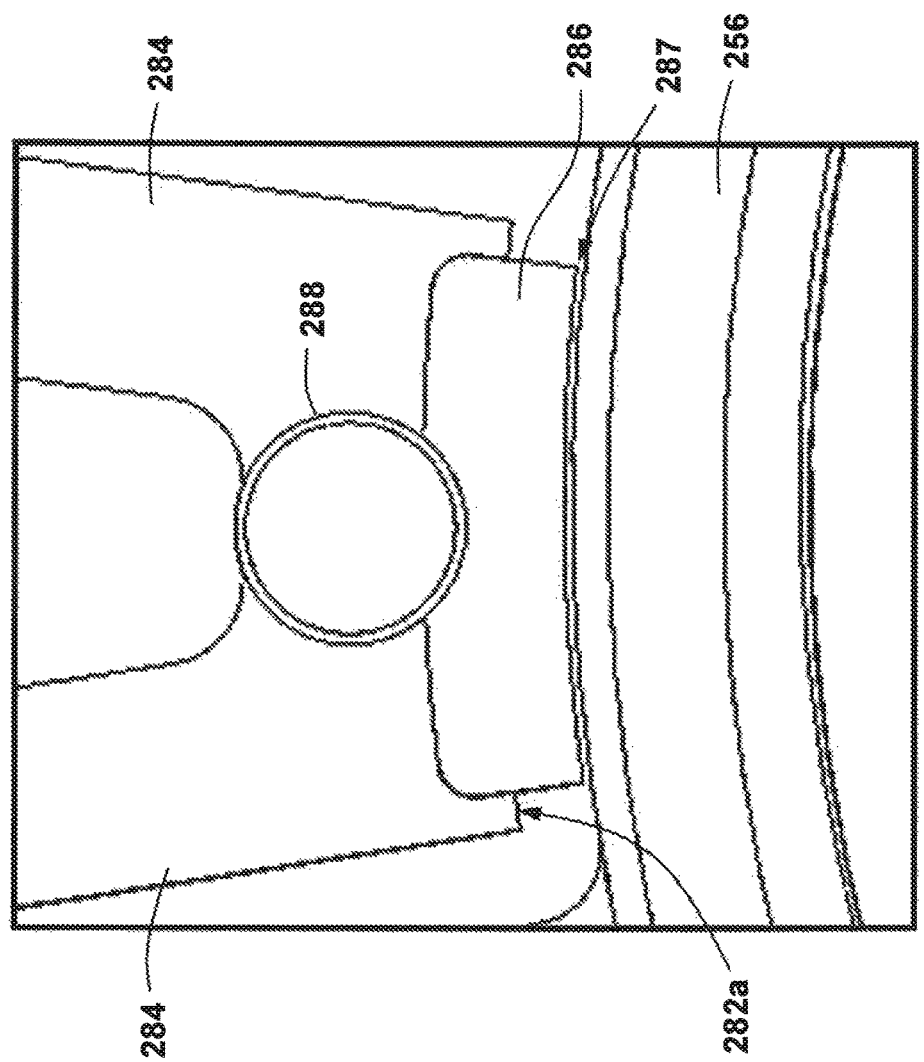
FIG. 14 is an enlarged front view of the one of the bearing members of the input disk of the torque measurement assembly of FIG. 12.

Referring now to FIGS. 12-14, a plurality of bearing assemblies 280 are mounted to outer toothed section 254. Each bearing assembly 280 includes a plurality of circumferentially spaced bearing members 282 that extend radially inward toward hub 256. Each bearing member 282 includes one or more (two in this embodiment) radially oriented spokes 284 and a bushing 286 mounted to radially inner end of spokes 284 with pins or rivets 288. As shown in FIG. 14, when no relative loads are placed on outer toothed section 254 and hub 256 (see FIGS. 12 and 13), there is a clearance 287 extending radially between bushing 286 and hub 256 such that bushing 286 does not contact hub 256. However, in the event that hub 256 experiences a radially directed load relative to toothed section 254, one or more of the bushings 286 may be brought into engagement with hub 256 thereby impeding further relative radial motion between outer toothed section 254 and hub 256. As a result, bearing assemblies 280 generally maintain the relative radial positioning of outer toothed section 254 and hub 256 during operations. As with deformable members 270, in some embodiments, bearing assemblies 280 are separate and independent components that are secured (e.g., via welding, adhesive, bolts, rivets, pins, etc.) to outer toothed section 254. However, in this embodiment, bearing assemblies 280 (or at least a portion of bearing assemblies 280) are integrally formed with the other components of input disk 252 (e.g., outer toothed section 254, hub 256, deformable members 270).

Referring again to FIGS. 12 and 13, ratchet ring 260 is substantially the same as ratchet ring 160 previously described, except that no mounting projections 163 and apertures 162 are disposed about the outer periphery or perimeter, and ratchet ring 260 is simply threadably engaged to female threads 258 (see FIG. 13) in receptacle 257 of hub 256. In other embodiments, ratchet ring 260 may be secured within receptacle 257 in any other suitable fashion, such as, for example, with welds, bolts, adhesive, etc. In still other embodiments, ratchet ring 260 may be integrally formed with hub 256 such that hub 256 and ratchet ring 260 comprise a single monolithic piece. Ratchet ring 260 also includes the plurality of ratchet teeth 164 along an inner periphery thereof, where the ratchet teeth 164 are the same as previously described above for ratchet ring 160.

During operations, input shaft 132 and transfer ring 170 are secured to one another by inter-engaging the splines 134, 172, as previously described. Then input shaft 132 and transfer ring 170 are inserted within ratchet ring 260 such that pawls 176 pivotably mounted within recesses 174 on transfer ring 170 engage with ratchet teeth 164 in the manner previously described above. In addition, while not specifically shown, as input shaft 132 and transfer ring 170 are inserted within ratchet ring 260, shaft 132 is also inserted through central aperture 253 in hub 256. Thereafter, as with torque measurement assembly 150, a rotation of input shaft 132 and transfer ring 170 along the first direction 101 causes abutting engagement between pawls 176 and ratchet teeth 164 such that torque is transferred from input shaft 132 to ratchet ring 260 and ratchet ring 260 rotates along with shaft 132 about axis 105. Conversely, a rotation of input shaft 132 and transfer ring 170 along the second direction 103 causes sliding engagement between pawls 176 and ratchet teeth 164 such that no torque is transferred from input shaft 132 to ratchet ring 260 about axis 105 (i.e., so that input shaft 132 and transfer ring 170 may rotate relative to ratchet ring 260 about axis 105). In addition, because ratchet ring 260 is engaged with hub 256 of input disk 252, as input shaft 132, transfer ring 170, and ratchet ring 260 all rotate about axis 105 along the first direction 101, input disk 252 (including outer toothed section 254 and hub 256) also rotates about axis 105 in the first direction 101. During this rotation, if a torque is applied to hub 256 (via input shaft 132, transfer ring 170, and ratchet ring 260) relative to outer toothed section 254, hub 256 is allowed to rotate relative to outer toothed section 254 as a result of circumferential compression of deformable members 270 in the manner previously described above. As is similarly described above for deformable members 180 on torque measurement assembly 150, because deformable members 270 are configured to bias their corresponding ends 270a, 270b circumferentially apart from one another (relative to the spring constant $K_{270}$, previously described), the circumferential compression of bodies 270c of deformable members 270 described above results in a biasing force being applied to input disk 252 and ratchet ring 260 to rotationally urge ratchet ring 260 to rotate back along the second direction 103 to place each of the deformable members 270 in a substantially neutral position or state (i.e., where no or substantially no biasing force is applied by members 270 to input disk 252 and ratchet ring 260). Thus, when torque is no longer applied to input shaft 132 via pedal assemblies 120, ratchet ring 260 and hub 256 rotate back along direction 103 by the biasing force applied by deformable members 270 to return to a neutral position relative to outer toothed section 254.

Referring again to FIGS. 12 and 13, outer toothed section 254 includes a plurality of mounting apertures 251 that are configured to align with mounting apertures 194 of outer ring 190 (see FIGS. 5 and 6), and hub 256 includes a plurality of mounting apertures 262 that are configured to align with mounting apertures 204 on inner ring 200 (see FIGS. 5 and 6). As a result, outer ring 190 may be mounted to outer toothed section 254, and inner ring 200 may be mounted to hub 256. Sensor unit 210 (not shown—see FIG. 9) may be mounted adjacent to rings 190, 200 to measure relative rotational angle shift between rings 190, 200 and thus also between outer toothed section 254 and hub 256, ratchet ring 260, transfer ring 170, and input shaft 132 during operations in the same manner as previously described above for torque measurement assembly 150. Thus, a detailed description of these operations for torque measurement assembly 250 is omitted in the interests of brevity.

Figure 15:
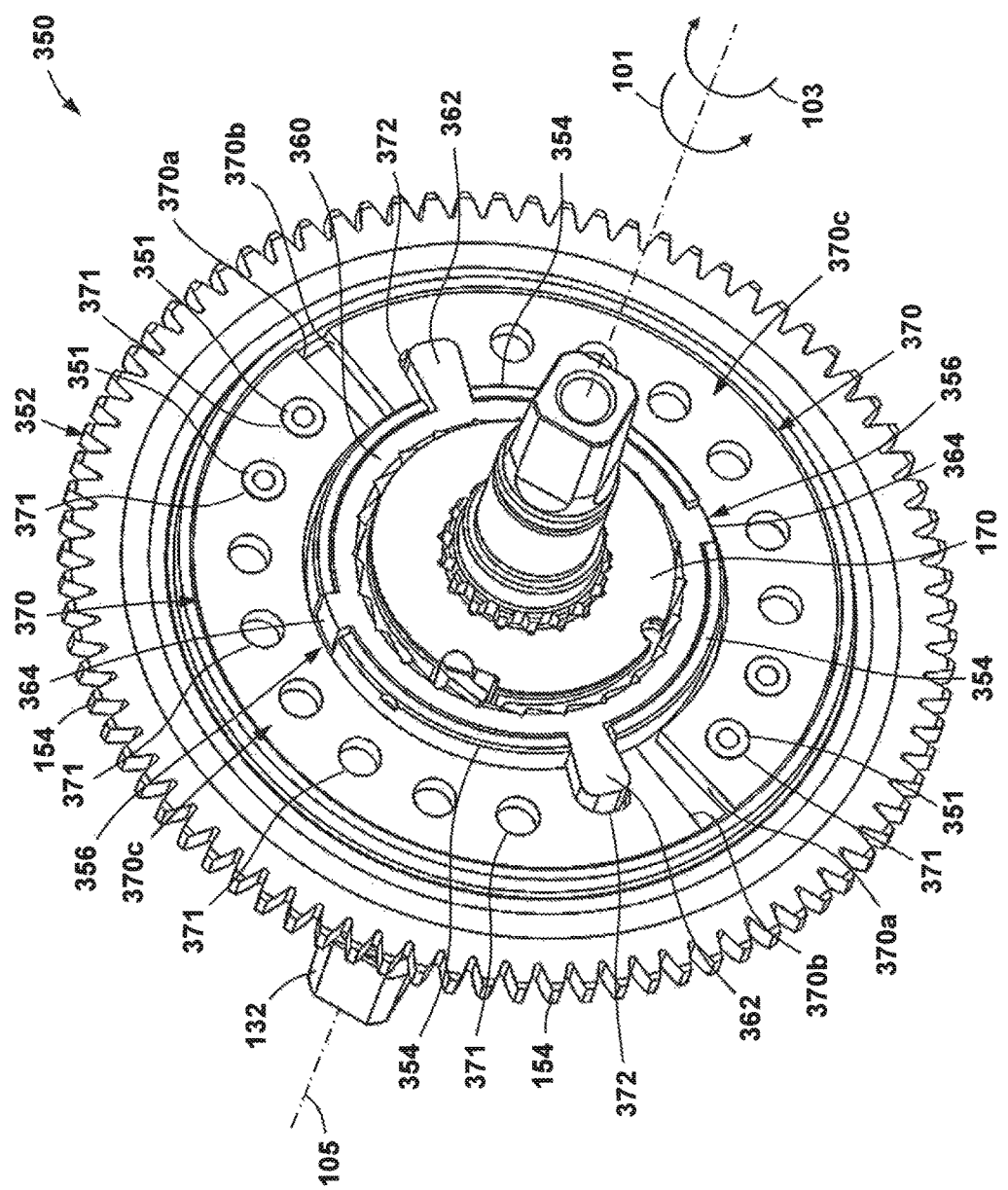
FIG. 15 is a perspective view of another torque measurement assembly for use within the transportation device of FIG. 1 in accordance with at least some embodiments.
Figure 16:
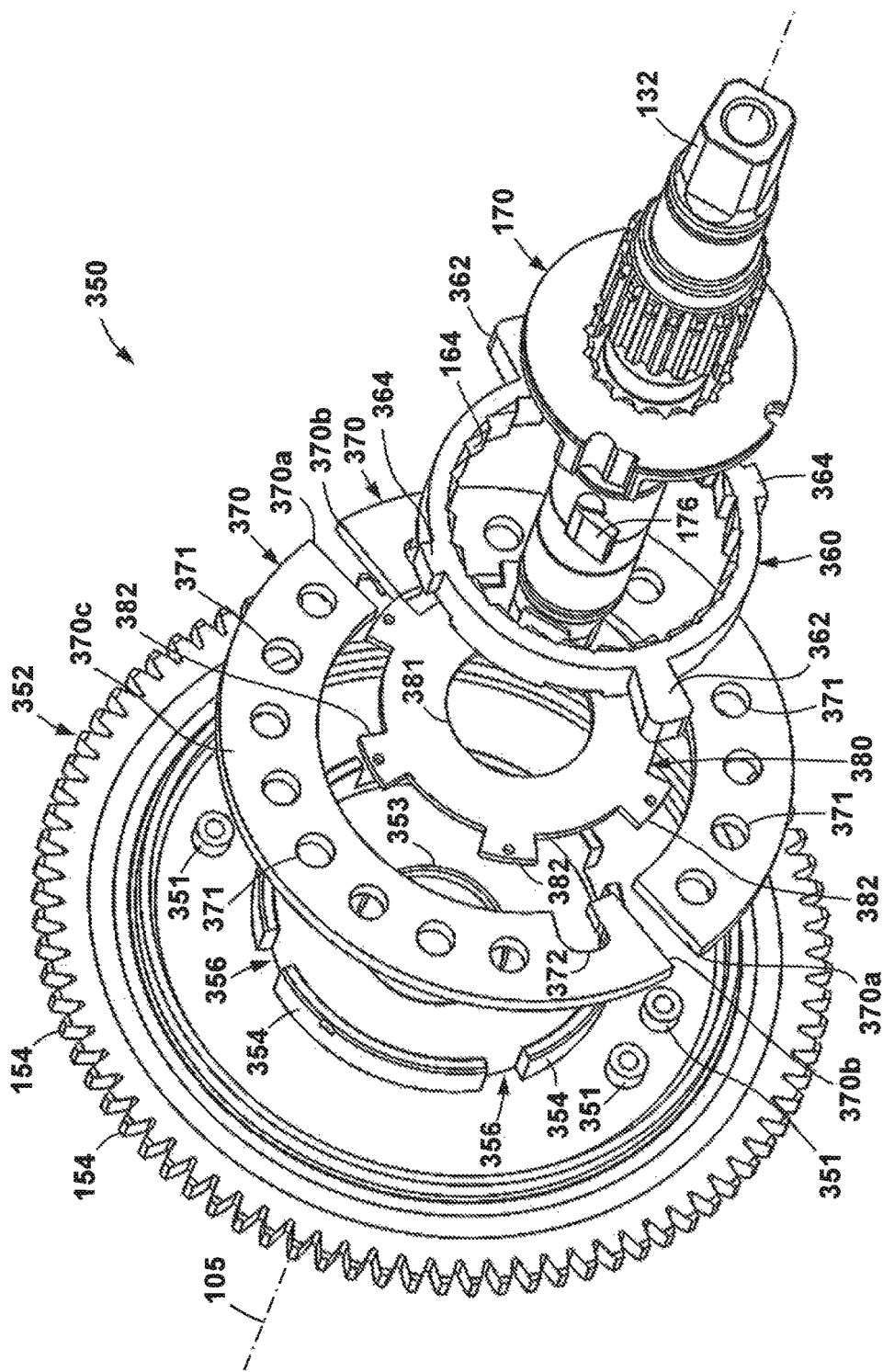
FIG. 16 is an exploded view of the torque measurement assembly of FIG. 15.

Referring now to FIGS. 15 and 16, another embodiment of torque measurement assembly 350 is shown with input shaft 132 but otherwise independent of other components of transportation device 10 (see FIG. 1). Torque measurement assembly 350 is substantially similar to torque measurement assembly 150 (see FIGS. 5 and 6), and thus, like components are identified with like reference numerals, and the description below will focus on the components and features of torque measurement assembly 350 that are different from torque measurement assembly 150. In this embodiment, torque measurement assembly 350 includes an input disk 352 in place of input disk 152 (see FIGS. 5 and 6), and a ratchet ring 360 in place of ratchet ring 160 (see FIGS. 5 and 6). In addition, in this embodiment, torque measurement assembly 350 includes a star plate 380, and a pair of deformable members 370. Further, while not specifically shown, torque measurement assembly 350 also includes outer and inner rings 190, 200 and sensor unit 210 shown and described above for torque measurement assembly 150. These components (i.e., rings 190, 200, and sensor unit 210) are not shown on torque measurement assembly 350 in FIGS. 15 and 16 to better show the other components of assembly 350, and so as not to unduly complicate the figure.

Input disk 352 includes teeth 154, previously described, a central aperture 353 extending through input disk 352 along axis 105, and a plurality of axially extending arcuate retainer walls or projections 354 circumferentially disposed about central aperture 353 that define a plurality of gaps or recesses 356 therebetween. In this embodiment, there are a total of four (4) retainer walls 354, and a total of four (4) gaps 356 defined therebetween. Each of the gaps 356 is circumferentially spaced approximately 90° about axis 105 from each immediately adjacent gap 356.

Referring still to FIGS. 15 and 16, deformable members 370 each include a first end 370a, a second end 370b, and a curved body 370c extend between ends 370a, 370b. Body 370c includes a plurality of apertures 371 extending therethrough. In addition, an engagement recess 372 extends into body 370c proximate second end 370b. Deformable members 370 are secured to input disk 352 by inserting bosses 351 disposed radially outside of retainer walls 354 into one or more (two in this embodiment) of the apertures 371. In this embodiment, bosses 351 are inserted into the two apertures 371 closest to first end 370a on each deformable member 370 such that each of the deformable members 370 is cantilevered from the corresponding bosses 351. The additional apertures 371 (i.e., the apertures 371 not engaged with bosses 351) are included on bodies 370c to reduce the mass (and therefore weight) of deformable members 370 as desired. However, it should be appreciated that in other embodiments, only apertures 371 for receiving bosses 351 are included on bodies 370c of deformable members 370. In some embodiments, additional coupling members (e.g., screws, bolts, rivets, pins, etc.) may be inserted within bosses 351 to further secure deformable members 370 to input disk 352. As best shown in FIG. 15, deformable members 370 are mounted to input disk 352 such that first end 370a of each deformable member 370 is circumferentially adjacent the second end 370b of the other deformable member 370. In addition, each deformable member 370 is mounted to input disk 352 such that engagement recess 372 is generally circumferentially aligned with one of the gaps 356 between retainer walls 354.

Ratchet ring 360 is substantially the same as ratchet ring 160 previously described, except that no mounting projections 163 and apertures 162 are disposed about the outer periphery or perimeter. Rather, ratchet ring 360 includes a pair of radially extending engagement ears 362 and a pair of radially extending rotation stops 364. Engagement ears 362 are disposed radially opposite one another along ratchet ring 360 about axis 105, and rotation stops 364 are disposed radially opposite one another along ratchet ring 360 about axis 105 (i.e., ears 362 are disposed approximately 180° from one another about axis 105, and stops 364 are disposed approximately 180° from one another about axis 105). In addition, ratchet ring 360 also includes the plurality of ratchet teeth 164 along an inner periphery thereof, where the ratchet teeth 164 are the same as previously described above for ratchet ring 160.

During operations, ratchet ring 360 is engaged with input disk 352 such that engagement ears 362 are inserted through two of the gaps 356, and rotation stops 364 are inserted through two of the gaps 356. It should be appreciated that gaps 356 are circumferentially wider or larger than each of the engagement ears 362 and rotation stops 364 such that ratchet ring 360 may pivot or rotate relative to input disk 352 until engagement ears 362 and/or stops 364 engage or abut with retainer walls 354. In some embodiments, the sizing of gaps 356, ears 362, and stops 364 is such that ratchet ring 360 may rotate 4° or less relative to input disk 352. In other embodiments, the sizing of gaps 356, ears 362, and stops 364 is such that ratchet ring 360 may rotate 2° or less relative to input disk 352. As shown in FIG. 16, a star plate 380 including a plurality of radial projections 382 is engaged to ratchet ring 360 and disposed axially between ratchet ring 360 and input disk 352. Projections 382 are sized to closely approach (or engage in some embodiments) retainer walls 354 such that ratchet ring 360 is centrally maintained within retainer walls 354 of input disk 352 during operations. Star plate 380 also includes a central aperture 381 extending axially therethrough that receives input shaft 132 during operations.

In addition, when ratchet ring 360 is mounted to input disk 352, each engagement ear 362 is also engaged within one of the engagement recess 372 in one of the deformable members 370. Thus, it should be appreciated that during operations, a rotation of ratchet ring 360 in the first direction 101 (which is accommodated by the relative sizing of gaps 356, ears 362, and stops 364) causes body 370c of deformable members 370 to bend or curve due to the engagement between ears 362 and recesses 372 and the mounting of deformable members to input disk 352 via bosses 351 and apertures 371. In this embodiment, deformable members 370 are sufficiently rigid such that body 370c may act as a spring to maintain a substantially neutral curved position shown in FIGS. 15 and 16. Thus, each of the deformable members 370 may have a spring constant $K_{370}$ that is known or determinable by one of ordinary skill. As a result, as is similarly described above for deformable members 180 on torque measurement assembly 150, the bending of bodies 370c of deformable members 370 described above results in a biasing force being applied to input disk 352 and ratchet ring 360 to rotationally urge ratchet ring 360 to rotate back along the second direction 103 to place each of the deformable members 370 back in a substantially neutral position or state (i.e., where no or substantially no biasing force is applied by members 370 to input disk 352 and ratchet ring 360).

Once deformable members 370 and ratchet ring 360 are mounted to input disk in the manner described above, input shaft 132 and transfer ring 170 are secured to one another by inter-engaging the splines 134, 172, as previously described. Then, input shaft 132 and transfer ring 170 are inserted within ratchet ring 360 such that pawls 176 pivotably mounted within recesses 174 on retainer ring 170 engage with ratchet teeth 164 in the manner previously described above. In addition, while not specifically shown, as input shaft 132 and transfer ring 170 are inserted within ratchet ring 360, shaft 132 is also inserted through central aperture 353 in input disk 352 and central aperture 381 in star plate 380 (see FIG. 16). Thereafter, as with torque measurement assembly 150, a rotation of input shaft 132 and transfer ring 170 along the first direction 101 causes abutting engagement between pawls 176 and ratchet teeth 164 such that torque is transferred from input shaft 132 to ratchet ring 360 thereby causing ratchet ring 360 to rotate along within shaft 132 about axis 105. Conversely, a rotation of input shaft 132 and transfer ring 170 along the second direction 103 causes sliding engagement between pawls 176 and ratchet teeth 164 such that no torque is transferred from input shaft 132 to ratchet ring 360 about axis 105 (i.e., so that input shaft 132 and transfer ring 170 may rotate relative to ratchet ring 360 and input disk 352 about axis 105). In addition, because ratchet ring 360 is engaged with input disk 352 via ears 362 and deformable members 370, as input shaft 132, transfer ring 170, and ratchet ring 360 all rotate about axis 105 along the first direction 101, input disk 352 also rotates about axis 105 in the first direction 101. During this rotation, if a torque is applied to ratchet ring 360 (via input shaft 132 and transfer ring 170) relative to input disk 352, ratchet ring 360 is allowed to rotate relative to input disk 352 as a result of the bending of deformable members 370 and relative sizing of gaps 356, ears 362, and stops 364 as described above.

Referring still to FIGS. 15 and 16, although not shown, outer ring 190 may be mounted to input disk 352 such that ring 190 rotates with input disk 352 about axis 105 during operations. In addition, while also not shown, inner ring 200 may be mounted to ratchet ring 360 such that inner ring 200 rotates with ratchet ring 360 about axis 105 during operations (note: with inner ring 200 mounted to ratchet ring 360, inner ring 200 would also rotate along with transfer ring 170 and input shaft 132 about axis 105 when each of the input shaft 132, transfer ring 170, and ratchet ring 360 are all rotating in the first direction 101 due to the engagement of pawls 176 and ratchet teeth 164 as described). Further, sensor unit 210 (not shown—see FIG. 9) may be mounted adjacent to rings 190, 200 to measure relative rotational angle shift between rings 190, 200 and thus also between input disk 352 and ratchet ring 360, transfer ring 170, and input shaft 132 during operations in the same manner as previously described above for torque measurement assembly 150. Thus, a detailed description of these operations for torque measurement assembly 350 is omitted in the interests of brevity.

Figure 17:
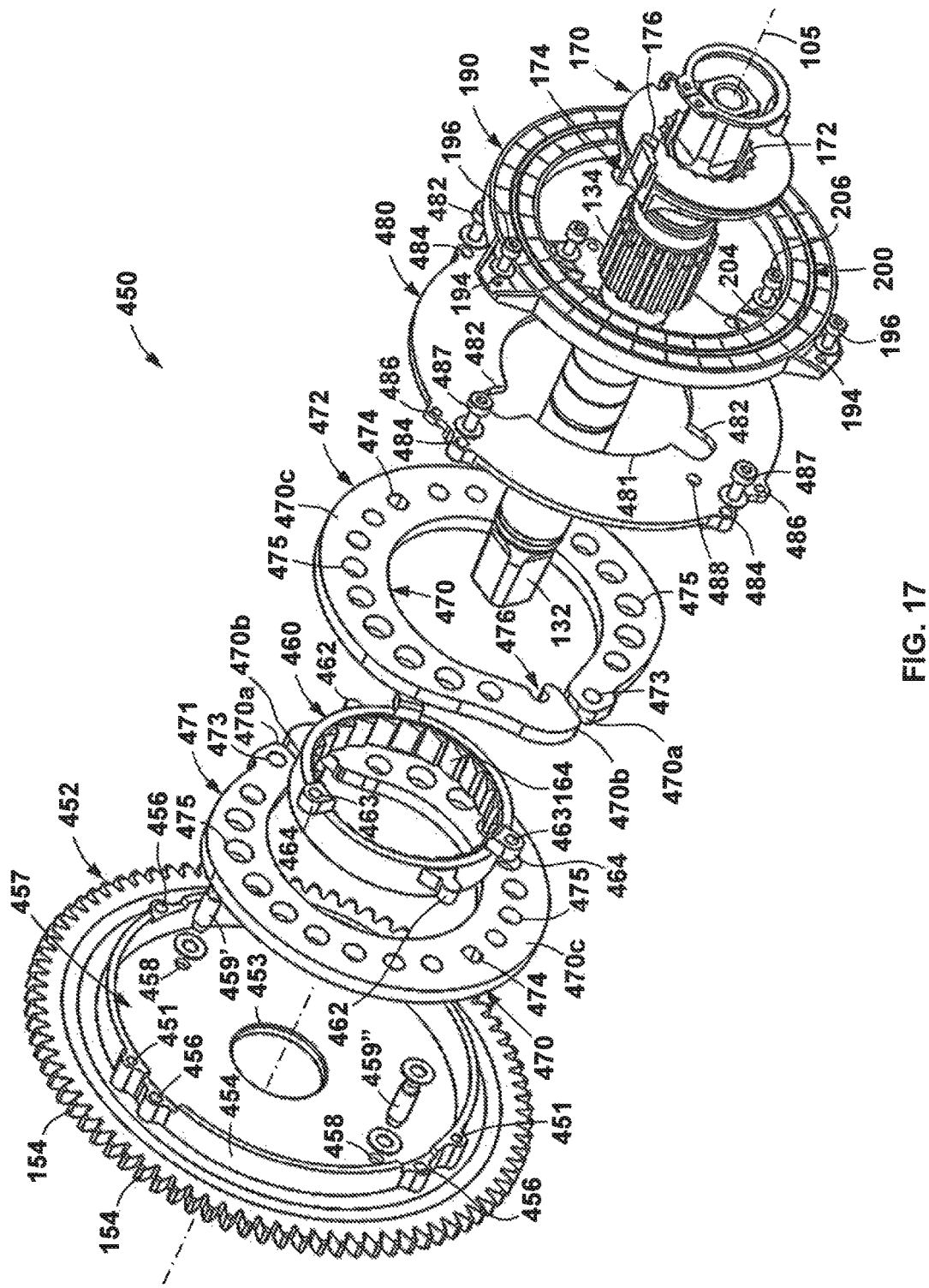
FIG. 17 is an exploded view of another torque measurement assembly for use within the transportation device of FIG. 1 in accordance with at least some embodiments.

Referring now to FIG. 17, another embodiment of torque measurement assembly 450 is shown with input shaft 132 but otherwise independent of other components of transportation device 10 (see FIG. 1). Torque measurement assembly 450 is substantially similar to torque measurement assembly 150 (see FIGS. 5 and 6), and thus, like components are identified with like reference numerals, and the description below will focus on the components and features of torque measurement assembly 450 that are different from torque measurement assembly 150. In this embodiment, torque measurement assembly 450 includes an input disk 452 in place of input disk 152 (see FIGS. 5 and 6), and a ratchet ring 460 in place of ratchet ring 160 (see FIGS. 5 and 6). In addition, in this embodiment, torque measurement assembly 450 includes a pair of deformable members 471, 472. Further, torque measurement assembly 450 includes outer and inner rings 190, 200 and while not specifically shown also includes sensor unit 210 shown and described above for torque measurement assembly 150.

Input disk 452 includes the plurality of teeth 154, being the same as previously described above for input disk 152. In addition, input disk 452 includes an axially extending circumferential retainer wall 454 that defines a receptacle 457, and a central aperture 453 extending through input disk 452 along axis 105. A pair of mounting apertures 458 extends through input disk 452 radially within retainer wall 454. Each aperture 458 receives a pin therethrough—with one of the apertures 458 receiving a first pin 459' and the other of the apertures 458 receiving a second pin 459". In addition, apertures 458 are disposed radially opposite one another across axis 105 such that both apertures 458 and pins 459', 459" (when pins 459', 459" are installed in apertures 458) are disposed approximately 180° apart from one another about axis 105. As will be described in more detail below, pins 459', 459" engage with deformable members 471, 472 to transfer loads between input disk 452 and deformable members 471, 472 during operations. Further, each of the pins 459', 459" are also received within one of a pair of mounting apertures 488 extending through a cover plate 480 which is mounted to input disk 452 (note: only one aperture 488 is visible in FIG. 17).

Retainer wall 454 also includes a plurality of mounting apertures 456 and a plurality of mounting apertures 451. As will be described in more detail below, the plurality of mounting apertures 456 are used to mount the cover plate 480 to input disk 452, and the plurality of mounting apertures 451 are used to mount outer ring 190 to input disk 452. In this embodiment, there are a total of four (4) apertures 456 evenly circumferentially spaced about axis 105 on retainer wall 454 such that each aperture 456 is circumferentially spaced approximately 90° from each immediately adjacent aperture 456. In addition, in this embodiment, there are a total of three (3) apertures 451 evenly circumferentially spaced about axis 105 such that each aperture 451 is circumferentially spaced approximately 120° from each immediately adjacent aperture 451.

Referring still to FIG. 17, ratchet ring 460 is substantially the same as ratchet ring 160 previously described, except that mounting projections 163 and apertures 162 are not disposed about the outer periphery or perimeter (see FIGS. 5 and 6). Rather, ratchet ring 460 includes, on its outer periphery or perimeter, a pair of radially extending engagement ears 462 and a plurality of radially extending mounting members 464, each including a mounting aperture 463 extending therethrough. Engagement ears 462 are radially opposite one another along ratchet ring 460 about axis 105 (i.e., ears 462 are disposed approximately 180° from one another about axis 105). Also, mounting members 464 are evenly circumferentially spaced along the outer periphery or perimeter of ratchet ring 460 about axis 105. In this embodiment, there are a total of three (3) mounting members 464 that are spaced approximately 120° apart from one another about axis 105. In addition, ratchet ring 460 also includes the plurality of ratchet teeth 164 along an inner periphery thereof, where the ratchet teeth 164 are the same as previously described above for ratchet ring 160.

Deformable members 471, 472 each include a C-shaped body 470 that includes a first end 470a, a second end 470b, and a curved section 470c extending between ends 470a, 470b. A clearance aperture 474 extends through curved section 470c at substantially a midpoint between ends 470a, 470b. In addition, a plurality of apertures 475 also extend through curved section 470c and are arranged both from clearance aperture 474 toward end 470a and from clearance aperture 474 toward end 470b. Without being limited to this or any other theory, apertures 475 are used to remove excess material from bodies 470 of deformable members 471, 472 so as to limit the weight of torque measurement assembly 450. A mounting aperture 473 extends through curved section 470c at or proximate to first end 470a, and an engagement recess or notch 476 extends into curved section 470c at or proximate to second end 470b.

Figure 18:
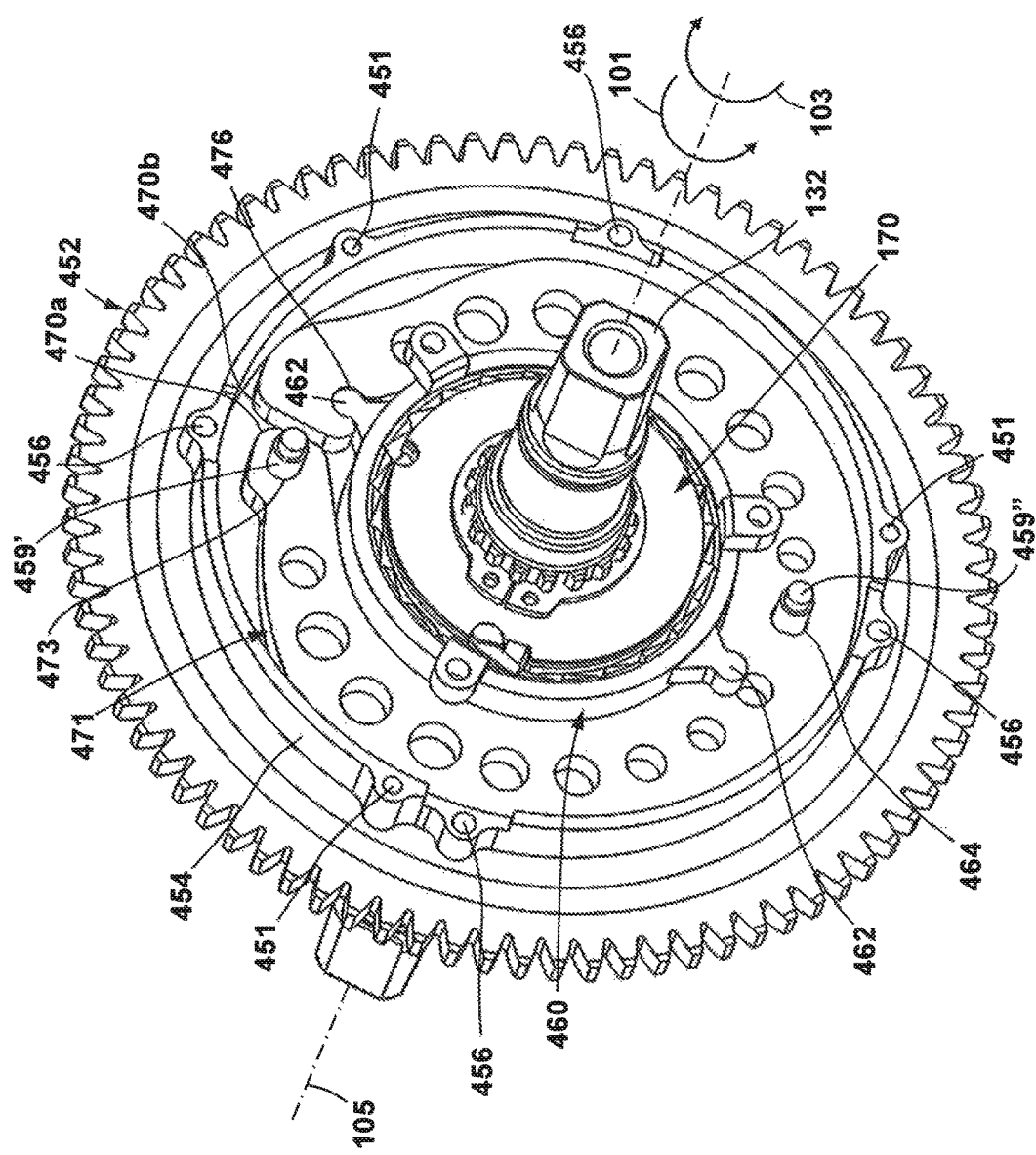
FIG. 18 is a perspective view of the torque measurement assembly of FIG. 17 with only one of the deformable members installed thereon.
Figure 19:
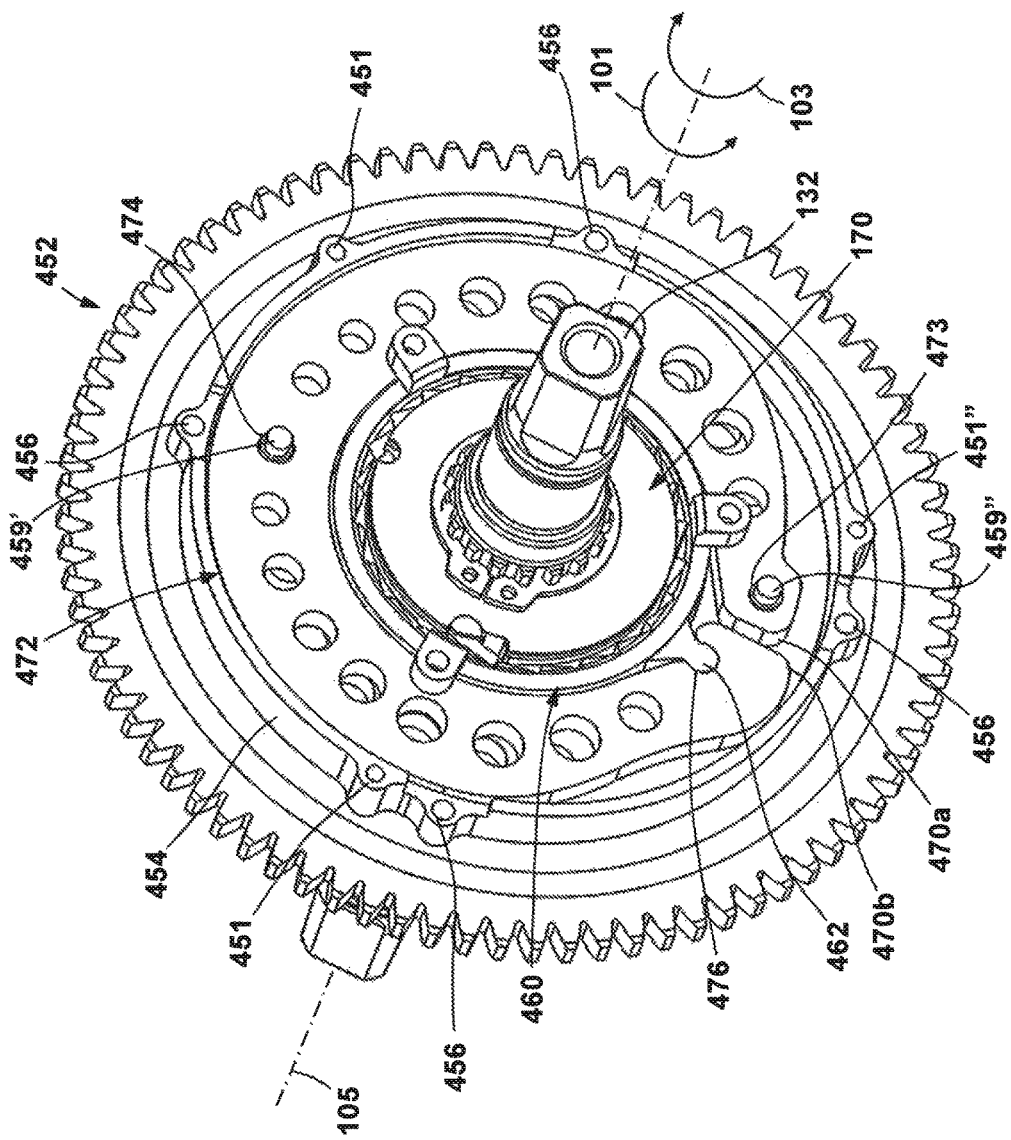
FIG. 19 is another perspective view of the torque measurement assembly of FIG. 17 with both deformable members installed thereon.

Referring now to FIGS. 17-19, during operations, deformable member 471 is inserted axially within receptacle 457 such that mounting aperture 473 on deformable member 471 receives pin 459', and clearance aperture 474 on deformable member 471 receives pin 459". Clearance aperture 474 on deformable member 471 is sized and shaped so as to receive pin 459" therethrough with limited, if any, resistance and engagement. For example, in some embodiments, clearance aperture 474 is substantially elliptical or elongated in shape. As will be described in more detail below, the lack of engagement between clearance aperture 474 and pin 459" prevents any (or substantially any) forces or loads from being transferred between deformable member 471 and pin 459". Conversely, mounting aperture 473 is sized and shaped so as to substantially engage with pin 459' such that pin 459' may bear any forces or loads that are transferred between deformable member 471 and input disk 452 during operations. As is best shown in FIG. 18, once deformable member 471 is inserted within receptacle 457, ratchet ring 460 is also inserted axially within receptacle 457 such that one of the engagement ears 462 is received within the engagement notch 476 of deformable member 471.

Finally, as is best shown in FIG. 19, deformable member 472 is inserted axially within receptacle 457 such that mounting aperture 473 on deformable member 472 receives pin 459", and clearance aperture 474 on deformable member 472 receives pins 459'. As with deformable member 471, clearance aperture 474 on deformable member 472 is sized and shaped so as to receive pins 459' therethrough with limited, if any, resistance and engagement. For example, in some embodiments, clearance aperture 474 is substantially elliptical or elongated in shape. Thus, as explained for deformable member 471, the lack of engagement between clearance aperture 474 and pin 459' prevents any (or substantially any) forces or loads from being transferred between deformable member 472 and pin 459'. Conversely, mounting aperture 473 on deformable member 472 is sized and shaped so as to substantially engage with pin 459" such that pin 459" may bear any forces or loads that are transferred between deformable member 472 and input disk 452 during operations.

As is also shown in FIG. 19, one of the engagement ears 462 is inserted within engagement notch 476 of deformable member 472. Thus, one of the engagement ears 462 of ratchet ring 460 is inserted within the engagement notch 476 of deformable member 471, and the other of the engagement ears 462 on ratchet ring 460 is inserted within the engagement notch 476 of deformable member 472. In addition, in this embodiment, deformable member 472 is rotated approximately 180° in orientation from deformable member 471.

In other embodiments, ratchet ring 460 and deformable members 471, 472 are each first coupled to one another in the manner described above, and then the coupled ratchet ring 460 and deformable members 471, 472 are inserted axially together into receptacle 457. Thereafter, pins 459', 459" are inserted through apertures 473, 474 in deformable members 471, 472 and into apertures 458 as previously described.

Referring still to FIGS. 17-19, once deformable members 471, 472 and ratchet ring 460 are installed within receptacle 457 as described above, a rotation of ratchet ring 460 about axis 105 relative to input disk 452 along the first direction 101 causes engagement between engagement ears 462 on ratchet ring 460 and engagement notches 476 at second ends 470b of bodies 470 on deformable members 471, 472. Because first ends 470a of bodies 470 of deformable members 471, 472 are fixed relative to input disk 452 via the engagement of the corresponding pins 459, the rotation of ratchet ring 460 relative to input disk 452 and engagement of ears 462 within notches 476 results in a bending of bodies 470 of deformable members 471, 472 about axis 105 to bring ends 470a, 470b of each member 471, 472 circumferentially toward each other. In addition, because clearance apertures 474 on deformable members 471, 472 are sized and shaped to substantially avoid engagement (other than sliding engagement) pins 459", 459', respectively, no or substantially no forces or loads are transferred between input disk 452 and deformable members 471, 472 at clearance apertures 474. Rather, all (or substantially all) of the load transfer between deformable members 471 and input disk 452 occurs at and through the pin 459' (which extends through mounting aperture 473 of deformable member 471), and all of the load transfer between deformable member 472 and input disk 452 occurs at and through the pin 459" (which extends through the mounting aperture 473 of deformable member 472). Because pins 459', 459" are radially opposite one another about axis 105 along input disk 452, the load (e.g., torque) transfer between deformable members 471, 472 and input disk 452 is substantially balanced across axis 105 during operations.

In this embodiment, deformable members 471, 472 are sufficiently rigid such that body curved section 470c of bodies 470 may each act as a spring to maintain a substantially neutral curved position shown in FIGS. 17-19. Thus, each of the deformable members 471, 472 may have a spring constant $K_{470}$ that is known or determinable by one of ordinary skill. As a result, as is similarly described above for deformable members 180 on torque measurement assembly 150, the bending of curved sections 470c of bodies 470 of deformable members 471, 472 described above results in a biasing force being applied to input disk 452 and ratchet ring 460 to rotationally urge ratchet ring 460 to rotate back along the second direction 103 to place each of the deformable members 471, 472 back in a substantially neutral position or state (i.e., where no or substantially no biasing force is applied by members 471, 472 to input disk 452 and ratchet ring 460).

Either before or after deformable members 471, 472 and ratchet ring 460 are mounted within receptacle 457 of input disk 452 in the manner described above, input shaft 132 and transfer ring 170 are secured to one another by interengaging the splines 134, 172, as previously described. Then, input shaft 132 and transfer ring 170 are inserted within ratchet ring 460 such that pawls 176 are pivotably mounted within recesses 174 on transfer ring 170 engage with ratchet teeth 164 in the manner previously described above. In addition, while not specifically shown, as input shaft 132 and transfer ring 170 are inserted within ratchet ring 460, shaft 132 is also inserted through central aperture 453 in input disk 452 (see FIG. 17). Cover plate 480 may be secured to input disk 452 so as to cover receptacle 457 (and deformable members 471, 472, and ratchet ring 460 disposed within receptacle 457). Specifically, a plurality of mounting apertures 484 on cover plate 480 are aligned with the plurality of mounting apertures 456 on retainer wall 454 such that a plurality of coupling members (e.g., screws, rivets, nails, pins, etc.) may be inserted through the aligned apertures 456, 484 thereby securing cover plate 480 to input disk 452. Cover plate 480 includes a central aperture 481 that is sized and arranged to receive the input shaft 132 and transfer ring 170 therethrough along axis 105 during operations. Further, when cover plate 480 is secured to input disk 452, mounting apertures 488 each receive an end of one of the pins 459', 459" as previously described.

Once torque measurement assembly 450 is assembled, a rotation of input shaft 132 and transfer ring 170 along the first direction 101 causes abutting engagement between pawls 176 and ratchet teeth 164 such that torque is transferred from input shaft 132 to ratchet ring 460 thereby causing ratchet ring 460 to rotate along within shaft 132 about axis 105. Conversely, a rotation of input shaft 132 and transfer ring 170 along the second direction 103 causes sliding engagement between pawls 176 and ratchet teeth 164 such that no torque is transferred from input shaft 132 to ratchet ring 460 about axis 105 (i.e., so that input shaft 132 and transfer ring 170 may rotate relative to ratchet ring 460 and input disk 452 about axis 105). In addition, because ratchet ring 460 is secured to input disk 452 via deformable members 471, 472 as input shaft 132, transfer ring 170, and ratchet ring 460 all rotate about axis 105 along the first direction 101, input disk 452 also rotates about axis 105 in the first direction 101.

During this rotation, if a torque is applied to ratchet ring 460 (via input shaft 132 and transfer ring 170) relative to input disk 452, ratchet ring 460 is allowed to rotate relative to input disk 452 as a result of the bending of bodies 470 of deformable members 471, 472 in the manner previously described above. As is similarly described above for deformable members 180 on torque measurement assembly 150, because deformable members 471, 472 are sufficiently rigid to bias bodies back to a neutral position (relative to the spring constant $K_{470}$, previously described), the bending of bodies 470 of deformable members 471, 472 described above results in a biasing force being applied to input disk 452 and ratchet ring 460 to rotationally urge ratchet ring 460 to rotate back along the second direction 103. As a result, once the torque applied to ratchet ring 460 is removed, ratchet ring 460 will rotate about axis 105 along the direction 103 via the biasing forces applied by deformable members 471, 472 back to a substantially neutral position or state (i.e., where no or substantially no biasing force is applied by members 471, 472 to input disk 452 and ratchet ring 460).

Referring again to FIG. 17, outer ring 190 may be mounted to cover plate 480 which is further mounted to input disk 452 such that ring 190, cover plate 480, and input disk 452 all rotate together about axis 105 during operations. Specifically, mounting apertures 194 on outer ring 190 are aligned with mounting apertures 486 disposed about cover plate 480, which are further aligned with mounting apertures 451 disposed about retainer wall 454 such that coupling members 196, previously described, may be inserted and secured within the aligned apertures 194, 486, 451. In addition, inner ring 200 may be mounted to ratchet ring 460 by aligning mounting apertures 204 on inner ring 200 with the mounting apertures 463 extending through mounting members 464 on ratchet ring 460. Cover plate 480 includes a plurality of notches 482 extending radially from central aperture 481 that are sized, shaped, and arranged to generally align with mounting members 464 and apertures 463 on ratchet ring 460. Therefore, coupling members 206, previously described, may be inserted through the aligned mounting apertures 204 and notches 482 and secured within mounting apertures 463 in ratchet ring 460. As a result, inner ring 200 rotates with ratchet ring 460, transfer ring 170, and input shaft 132 about axis 105 during operations. Further, sensor unit 210 (not shown—see FIG. 9) may be mounted adjacent to rings 190, 200 in a similar manner to that described above for torque measurement assembly 150 to measure relative rotational angle shift between rings 190, 200 and thus also between input disk 452 and ratchet ring 460, transfer ring 170, and input shaft 132 during operations as also previously described. Thus, a detailed description of these operations is omitted for torque measurement assembly 450 in the interests of brevity.

Figure 20:
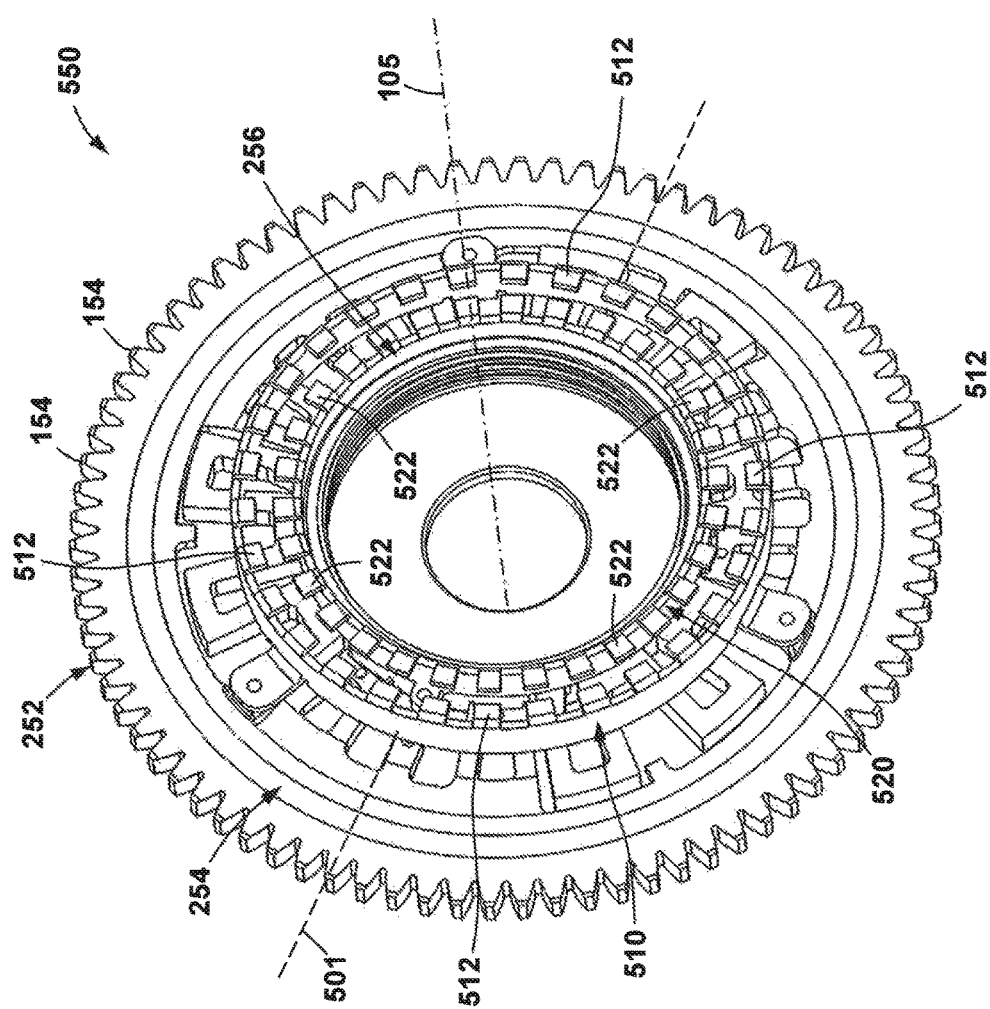
FIG. 20 is a perspective view of another torque measurement assembly for use within the transportation device of FIG. 1 in accordance with at least some embodiments.

While embodiments of the torque measurement assemblies disclosed herein (e.g., torque measurement assemblies 150, 250, 350, 450) having included outer and inner rings 190, 200 and sensor unit 210 for measuring a rotational angle shift between an input disk (e.g., input disk 152, 252, 352, 452) and an input shaft 132, it should be appreciated that other techniques and structures (i.e., other than rings 190, 200) may be used in other embodiments. For example, referring now to FIG. 20, a portion of another torque measurement assembly 550 is shown. In FIG. 20, torque measurement assembly 550 is shown to include an input disk 252 (which is the same as previously described above for torque measurement assembly 250), and pair of concentric rings 510, 520 mounted to input disk 252. While not shown, torque measurement assembly 550 also includes ratchet ring 260 and transfer ring 170 and is configured to mate and engage with input shaft 132 in the same manner as previously described above for torque measurement assembly 250; however, these additional components of torque measurement assembly 550 are not shown so as not to unduly complicate the figure.

Concentric rings 510, 520 include an outer ring 510 and an inner ring 520 concentrically disposed within outer ring 510. Each of the rings 510, 520 is arranged such that they are disposed within the same plane extending perpendicularly through axis 105 (e.g., the plane including the line segment 501 shown in FIG. 20). In addition, outer ring 510 includes a plurality of radially inwardly extending teeth 512 evenly circumferentially spaced about axis 105, and inner ring 520 includes a plurality of radially outwardly extending teeth 522 evenly circumferentially spaced about axis 105. In at least some embodiments, teeth 512, 522 of rings 510, 520, respectively, are constructed of a ferromagnetic conductive material, such as a metal or metal alloy.

Outer ring 510 is mounted to outer toothed section 254 of input disk 252 and inner ring 520 is mounted to hub 256. As previously described, hub 256 may rotate about axis 105 relative to outer toothed section 254 (e.g., such as when a torque is applied to hub 256 via ratchet ring 260, transfer ring 170, and input shaft 132 as previously described—see FIG. 12) as a result of the circumferential compression of deformable members 270. Thus, during operations, if a torque is applied to hub 256 about axis 105 relative to outer toothed section 254, inner ring 520 may rotate relative to outer ring 510. When deformable members 270 are in a neutral position or state (i.e., where deformable members 270 are not exerting a biasing force of either of the outer toothed section 254 or hub 256—see FIG. 12), the teeth 512 on outer ring 510 are generally circumferentially aligned with teeth 522 on inner ring 520. As a result, a relative rotation of inner ring 520 and outer ring 510 about axis 105 (e.g., as a result of a relative rotation of hub 256 relative to outer toothed section 254), will result in a circumferential misalignment of teeth 512 on outer ring 510 and teeth 522 on inner ring 520.

Figure 21:
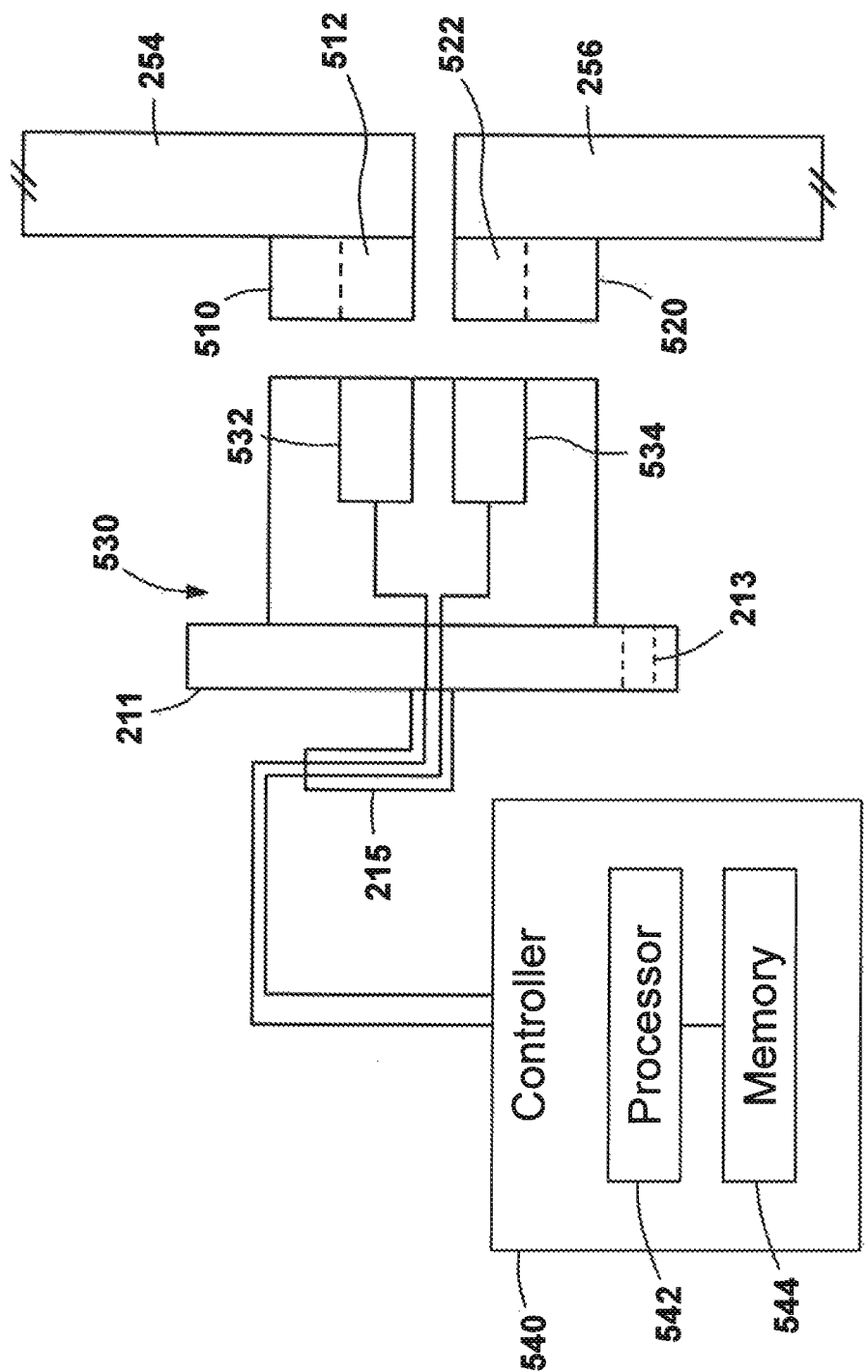
FIG. 21 is a schematic view of the sensor unit, first ring, and second ring of the torque measurement assembly of FIG. 20.

Referring now to FIG. 21, torque measurement assembly 550 also includes a sensor unit 530 mounted adjacent to outer ring 510 and inner ring 520. Sensor unit 530 is substantially similar to sensor unit 210, previously described, and thus, components of sensor unit 530 that are shared with sensor unit 210 are identified with like reference numerals, and the description of such components will not be repeated. Among other features, sensor unit 530 includes a pair of optical sensors 532, 534, with one optical sensor 532 being axially aligned with outer ring 510 and the other optical sensor 534 being axially aligned with the inner ring 520. Each of the optical sensors 532, 534 are electrically coupled to a controller 540 (which may be disposed outside sensor unit 530 as schematically shown in FIG. 21 or inside sensor unit 530 in other embodiments). While sensors 532, 534 have been described as optical sensors, it should be appreciated that sensors 532, 534 may be any suitable sensor such as, for example, inductive sensors, back biased Hall effect sensors, optical switches, back biased magneto resistance sensors, variable reluctance sensors, etc.

Figure 22:
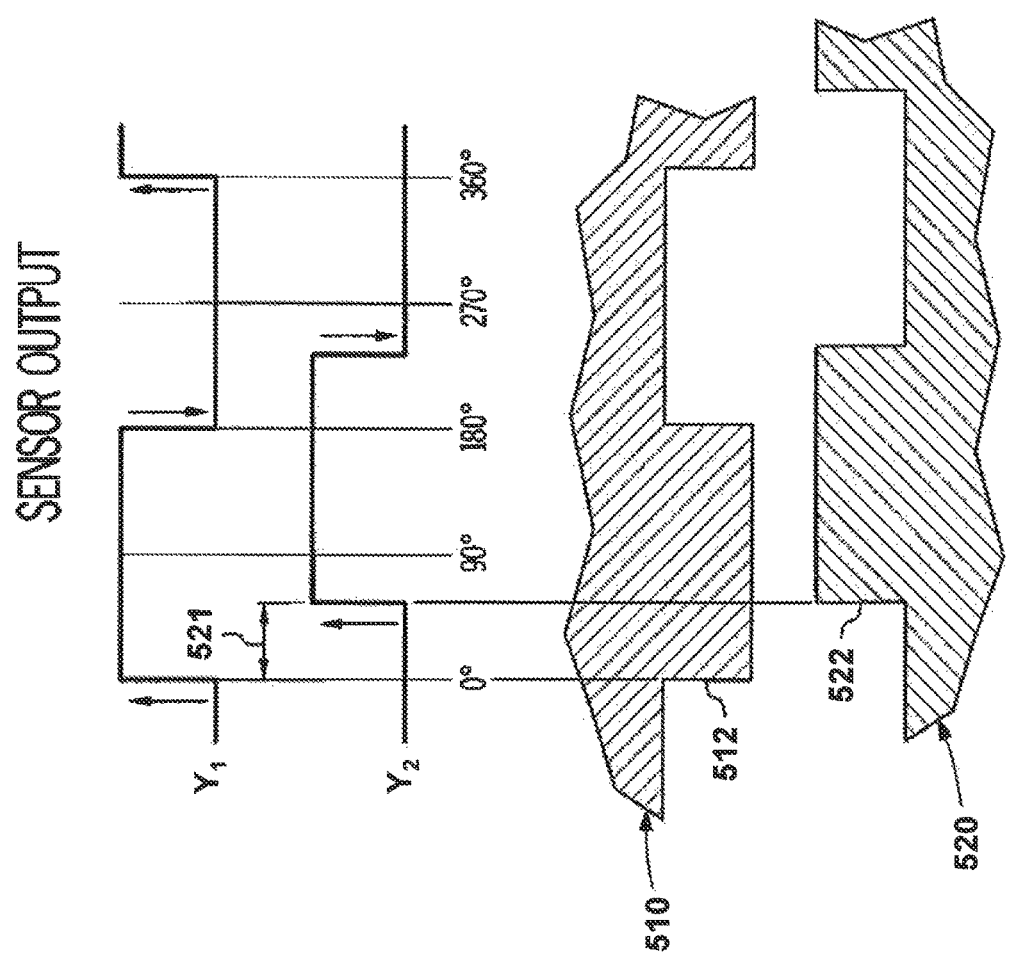
FIG. 22 is a schematic showing the periodic signals observed by the sensors of the sensor unit of FIG. 21.

Referring now to FIGS. 20-22, during operations, sensors 532, 534 observe and generate two periodic optical signals $Y_1$ and $Y_2$, respectively, representative of the presence of teeth 512, 522, on rings 510, 520, respectively, as rings 510, 520 rotate about axis 105. Alternatively, in embodiments where sensors 532, 534 are magnetic sensors, sensors 532, 534 propagate a magnetic field through the ferromagnetic, conductive teeth 512, 522, respectively, and observe and generate two periodic signals (e.g., signals $Y_1$, $Y_2$) representative the magnetic field surrounding sensors 532, 534. If hub 256 rotates about axis 105 relative to outer toothed section 254 in the manner described above (e.g., such that deformable members 270 are circumferentially compressed as previously described—see FIG. 12), the periodic signal $Y_2$ generated from the sensor 534 (which is aligned with the inner ring 520) is shifted compared to the periodic signal $Y_1$ generated from the sensor 532 (which is aligned with the outer ring 510). As illustrated in FIG. 22, a measure of a phase shift 521 between the two periodic signals $Y_1$ and $Y_2$ generated by the sensors 532, 534, respectively, is a direct measure of the rotational angle shift between the ratchet ring 260, transfer ring 170, input shaft 132 (see FIG. 12) and the input disk 252 about axis 105. As previously described above, this measured rotational angle shift is directly proportional to the torque applied to the input shaft 132 (e.g., via pedal assemblies 120—see FIG. 2). For example, without being limited by this or any other theory, the measured rotational angle shift and torque applied to input shaft 132 are related by the spring constants $K_{270}$ of the deformable members 270.

Like controller 220, controller 540 may include at least a processor 542 and a memory 544. The memory 544 may include software for execution on processor 542. Once a phase shift 521 is measured by sensors 532, 534, processor 542 may calculate (e.g., via a look up, calibration table, direct calculation, or some combination thereof), the torque applied to shaft 132. In some embodiments, controller 540 may then communicate the determined torque to another controller (e.g., controller 30—see FIG. 1) for controlling some other aspect or component of transportation device 10 (see FIG. 1). For example, in some embodiments, the determined torque may be communicated to controller 30 which then controls the torque output of motor 140. In still other embodiments, controller 540 may both perform the torque determination calculation described above and control some other aspect or component (e.g., torque output of motor 140—see FIGS. 3 and 4) of transportation device 10 as a result thereof.

It should be appreciated that while rings 510, 520 of torque measurement assembly 550 have been shown mounted to input disk 252, in other embodiments, rings 510, 520 and sensor unit 530 may be used in place of rings 190, 200 and sensor unit 210, respectively, in any of the torque measurement assemblies described herein (e.g., torque measurement assemblies 150, 250, 350, 450). When rings 510, 520 and sensor unit 530 are substituted for rings 190, 200 and sensor unit 210, respectively, the same or substantially the same phase shift sensing and torque determination described above may be performed to determine the torque applied to input shaft 132 relative to the corresponding input disk (e.g., input disk 152, 252, 352, 452, etc.).

Figure 23:
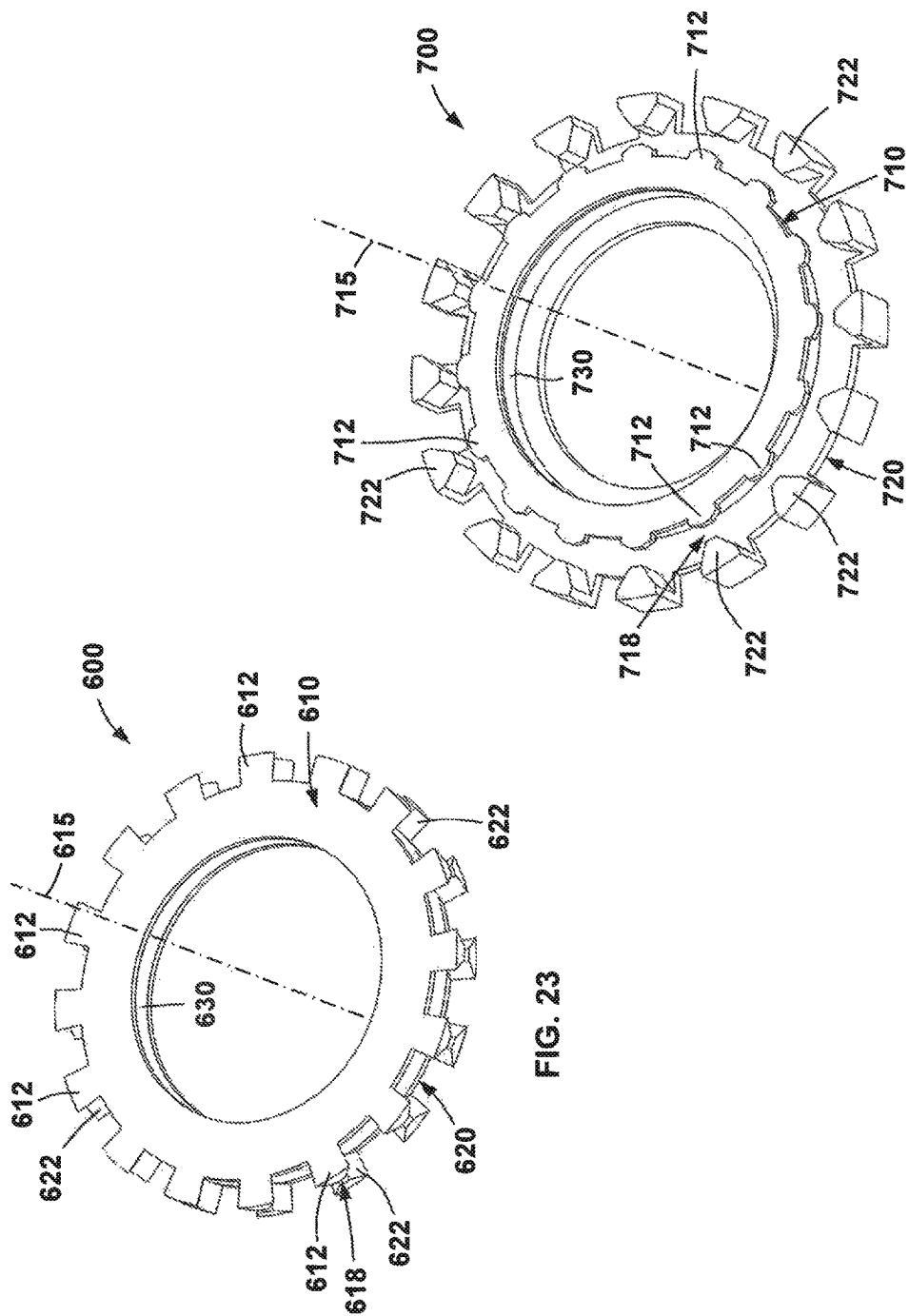
FIG. 23 is a perspective view of a torque measurement ring arrangement for use within any of the torque measurement assemblies disclosed herein.
Figure 24:
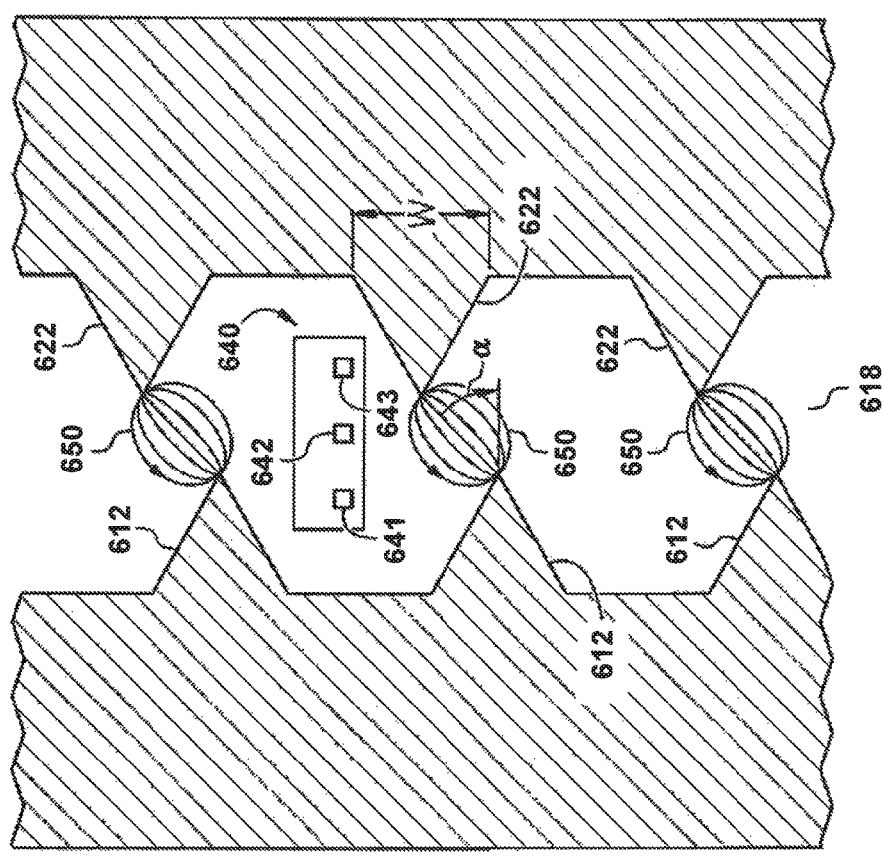
FIG. 24 is a schematic view showing the first ring and the second ring of the torque measurement ring arrangement of FIG. 23 rotationally displaced relative to one another.

Referring now to FIGS. 23-25, two alternative torque measurement ring arrangements 600 and 700, respectively, are shown for use within any one or more of the torque measurement assemblies 150, 250, 350, 450, etc. previously described. In the interests of brevity and so as not to unduly complicate the figures, only the ring arrangements 600, 700 are shown in FIGS. 23, 25, respectively.

Referring specifically to FIG. 23, torque measurement ring arrangement 600 includes a central axis 615 that is aligned with axis 105 of drive system 100 during operations (see FIGS. 2-4), a first ring 610, a second ring 620 axially spaced from first ring 610, and a magnetic ring 630 axially disposed between first ring 610 and second ring 620. In this embodiment, first and second rings 610, 620 comprise a ferromagnetic conductive material, such as, for example, a metal or metal alloy. In addition, in this embodiment, magnetic ring 630 comprises an axially magnetic ring including a north pole on one axial side and a south pole on the opposing axial side. In this embodiment, the axial side of ring 630 that faces or abuts first ring 610 includes a north pole of magnetic ring 630, and the axial side of ring 630 that faces or abuts second ring 620 includes a south pole of magnetic ring 630; however, the polarity of ring 630 may be different (e.g., opposite) in other embodiments.

Ring 610 includes a plurality of radially extending teeth 612 that are evenly circumferentially spaced about axis 615, and ring 620 includes a plurality of radially extending teeth 622 that are also evenly circumferentially spaced about axis 615. When rings 610, 620 are in their initial or neutral position, teeth 612, 622 are generally circumferentially aligned with one another about axis 615; however, during operation, first ring 610 coupled to one of the ratchet rings (e.g., rings 160, 260, 360, 460—see FIGS. 6, 12, 16, and 17), transfer ring 170, or input shaft 132, and second ring 620 may be secured to the input disk (e.g., input disks 152, 252, 352, 452, etc.). Thus, during operations, rings 610, 620 may rotate relative to one another about axis 615 (and thus also axis 105). The magnetic ring 630 may be secured to either or neither of the rings 610, 620 such that magnetic ring 630 may rotate along with first ring 610 or second ring 620. In addition, because magnetic ring 630 is axially disposed between rings 610, 620, there is an air gap 618 extending axially between teeth 612, 622. During operations, magnetic ring 630 generates a magnetic field that extends between rings 610, 620 and crosses the air gap 618 between teeth 612, 622.

Referring now to FIG. 24, a sensor unit 640 is disposed between rings 610, 620 (note: the shape of teeth 612, 622 is shown simplified into a simple triangular cross-section so as to not unduly complicate the figure; however, the specific shape or cross-section of teeth 612, 622 may be greatly varied in other embodiments). Sensor unit 640 includes a pair of Hall effect sensors 641, 643 (or alternatively, sensors 641, 643 may comprise magneto resistive speed sensors)—with sensor 641 being generally aligned with teeth 612 on first ring 610 and sensor 643 being generally aligned with teeth 622 on ring 620. In substantially the same manner as with sensor units 210 and 530, sensors 641, 643 may observe a pair of periodic signals (e.g., signals $X_1$, $X_2$, $Y_1$, $Y_2$ shown in FIGS. 11 and 22) representative of the periodic magnetic field sensed by the sensors 641, 643 as rings 610, 620 rotate about axes 615, 105 (see FIGS. 2-4). If one of the rings (e.g., ring 610) is rotationally shifted relative to the other (e.g., ring 620), such as would occur if input shaft 132 were subjected to a torque about axes 615, 105 relative to input disk (e.g., input disk 152, 252, 352, 452, etc.—see FIGS. 6, 12, 16, and 17), then the sensors 641, 643 would observe a phase shift (e.g., phase shifts 221, 521 shown in FIGS. 11, 22, respectively) between their respective periodic signals. As previously described, this measured phase shift provides a direct measure of the rotational angle shift between rings 610, 620, which is proportional to the torque applied to one ring relative to the other about axes 615, 105.

Referring still to FIG. 24, in addition, in this embodiment, sensor unit 640 includes a magnetic orientation sensor 642 disposed between sensors 641, 643 that is configured to measure or observe the angle of a magnetic field. Because the magnetic field generated by magnetic ring 630 (see FIG. 23) passes through the air gap 618 between axially opposing teeth 612, 622 as previously described, a rotational shift in one ring (e.g., ring 610) relative to the other (e.g., ring 620) results in a change in the orientation of the magnetic fields passing through air gap 618. Specifically, as shown in FIG. 24, the magnetic fields 650 passing through the air gap 618 between axially opposed teeth 612, 622 is shown as a prolate spheroid. When one ring (e.g., ring 610) rotationally shifts relative to the other ring (e.g., ring 620) the orientation angle α of fields 650 shifts to become some non-zero angle (e.g., an angle having an absolute value between 0° and 45° in some embodiments). The measurement of the orientation angle α can be used (e.g., along with the known structural arrangement and sizing of teeth 612, 622) to determine the rotational angle shift between rings 610, 620, which, as previously described, is proportional to the toque applied to one ring relative to the other about axes 615, 105. Because sensors 641, 643, and sensor 642 provide redundant measurements of the rotational angle shift between rings 610, 620, other embodiments may only employ sensors 641, 643 or sensor 642 on sensor unit 640.

Referring specifically now to FIG. 25, torque measurement ring arrangement 700, includes a central axis 715 that is aligned with axis 105 of drive system 100 during operations (see FIGS. 2-4), a first ring 710, a second ring 720 axially spaced from first ring 710, and a magnetic ring 730 axially disposed between first ring 710 and second ring 720. In this embodiment, first and second rings 710, 720 comprise a ferromagnetic conductive material, such as, for example, a metal or metal alloy. In addition, in this embodiment, magnetic ring 730 comprises an axially magnetic ring including a north pole on one axial side and a south pole on the opposing axial side. In this embodiment, the axial side of ring 730 that faces or abuts first ring 710 includes a north pole of magnetic ring 730, and the axial side of ring 730 that faces or abuts second ring 720 includes a south pole of magnetic ring 730; however, the polarity of ring 730 may be different (e.g., opposite) in other embodiments.

Ring 710 includes a plurality of radially extending teeth 712 that are evenly circumferentially spaced about axis 715, and ring 720 includes a plurality of axially extending teeth 722 that are also evenly circumferentially spaced about axis 715. When rings 710, 720 are in their initial or neutral position, teeth 712, 722 are generally circumferentially aligned with one another about axis 715; however, during operation, first ring 710 coupled to one of the ratchet rings (e.g., rings 160, 260, 360, 460—see FIGS. 6, 12, 16, and 17), transfer ring 170, or input shaft 132, and second ring 720 may be secured to the input disk (e.g., input disks 152, 252, 352, 452, etc.) (note: in other embodiments, first ring 710 may be coupled to the input disk, and the second ring 720 may be coupled to one of the ratchet ring, transfer ring, or input shaft). Thus, during operations, rings 710, 720 may rotate relative to one another about axis 715 (and thus also axis 105). The magnetic ring 730 may be secured to either or neither of the rings 710, 720 such that magnetic ring 730 may rotate along with first ring 710 or second ring 720. In addition, second ring 720 is radially larger than first ring 710 such that there is an air gap 718 extending radially between teeth 712, 722.

During operation, a sensor unit (not shown) that is similar to sensor unit 640 previously described is used to measure the rotational angle shift and relative torque between rings 710, 720 in the same fashion as described above for rings 610, 620 of arrangement 600, with the main difference being that the air gap 718 between teeth 712, 722 extends radially rather than axially relative to axis 715 (and thus also axis 105 during operations—see FIGS. 2-4). Accordingly, a detailed description of rotational angle shift measurement and torque determination for arrangement 700 is omitted in the interests of brevity.

In the manner described, through use of a torque measurement assembly (e.g., torque measurement assemblies 150, 250, 350, 450, 550, etc.) in accordance with the embodiments disclosed herein, a torque applied to a rotational shaft of a mechanical system (e.g., transportation device 10) may be more accuracy determined. In the specific context of motor-assisted bicycles (e.g., transportation device 10), through use of a torque measurement assembly in accordance with the embodiments disclosed herein, the controller of the motor-assisted bicycle (e.g., controller 30) may more accurately control the torque output of the motor, thereby enhancing performance of the motor-assisted bicycle during operations.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A torque measurement assembly for determining a torque applied to a shaft, the torque measurement assembly comprising:

a disk configured to be coupled to a motor such that the motor is configured to drive rotation of the disk about a central axis;
a first ring coupled to the disk;
a second ring coupled to the shaft;
a sensor unit configured to measure a rotational displacement between the first ring and the second ring about the central axis; and
one or more deformable members each formed as a substantially planar body that is planarly aligned with a plane normal to the central axis and coupled between the disk and the shaft, each deformable member including a pair of ends and a curved body extending between the pair of ends;
wherein for each deformable member, one of the pair of ends is directly coupled to a ring member that is configured to rotate in a substantially fixed relationship with the shaft when the shaft is rotating in at least one direction, and the other of the pair of ends is directly coupled to the disk such that a rotation of the shaft relative to the disk about the central axis is configured to cause the curved body to bend in the plane normal to the central axis.

2. The torque measurement assembly of claim 1, wherein the first ring and the second ring each comprise a magnet including a first plurality of sections and a second plurality of sections circumferentially disposed about the central axis;
wherein each of the first plurality of sections is circumferentially disposed between a pair of the second plurality of sections and each of the second plurality of sections is circumferentially disposed between a pair of the first plurality of sections;
wherein each of the first plurality of sections has a first magnetic pole; and
wherein each of the second plurality of sections has a second magnetic pole that is opposite to the first magnetic pole.

3. The torque measurement assembly of claim 2, wherein the first ring and the second ring are disposed within a single plane extending perpendicularly through the central axis.

4. The torque measurement assembly of claim 1, wherein the first ring and the second ring each comprise a plurality of ferromagnetic teeth.

5. The torque measurement assembly of claim 4, wherein there is an axially extending air gap between the plurality of teeth of the first ring and the plurality of teeth of the second ring, with respect to the central axis.

6. The torque measurement assembly of claim 4, wherein there is a radially extending air gap between the plurality of teeth of the first ring and the plurality of teeth of the second ring, with respect to the central axis.

7. The torque measurement assembly of claim 1, further comprising a ratchet ring coupled to the shaft;
wherein for each deformable member, one of the pair of ends is engaged with the ratchet ring and the other of the pair of ends is engaged with the disk.

8. The torque measurement assembly of claim 7, further comprising one or more pawls pivotably mounted between the shaft and the ratchet ring;
wherein the ratchet ring includes a plurality of ratchet teeth;
wherein a rotation of the shaft in a first rotational direction about the central axis causes the one or more pawls to abut with the ratchet teeth to thereby drive rotation of the ratchet ring in the first rotational direction; and
wherein a rotation of the shaft in a second rotational direction about the central axis, that is opposite the first rotational direction, causes the one or more pawls to slidingly engage the ratchet teeth to thereby allow rotation of the shaft relative to the ratchet ring.

9. The torque measurement assembly of claim 8, wherein for each deformable member, one of the pair of ends is pinned to the ratchet ring and the other of the pair of ends is pinned to the disk.

10. The torque measurement assembly of claim 8, wherein the ratchet ring includes one or more engagement ears;
wherein each deformable member includes a recess; and
wherein each of the one or more engagement ears are configured to be inserted within the recess of one of the deformable members.

11. A measurement assembly comprising:
a disk configured to rotate about a central axis, the disk comprising:
a hub configured to be coupled to a shaft;
an outer toothed section disposed about the hub, the outer toothed section configured to be coupled to a motor; and
one or more deformable members each formed as a substantially planar body that is planarly aligned with a plane normal to the central axis and extending between the outer toothed section and the hub, wherein rotation of the hub relative to the outer toothed section about the central axis causes deformation of the one or more deformable members in the plane normal to the central axis;
a first ring coupled to the disk;
a second ring coupled to the shaft; and
a sensor unit configured to measure a rotational displacement of the first ring and the second ring about the central axis,
wherein a first end of the deformable member is directly coupled to the disk, and a second end of the deformable member is directly coupled to a ring member that is configured to rotate in a substantially fixed relationship with the shaft when the shaft is rotating in at least one direction.

12. The measurement assembly of claim 11, wherein the outer toothed section, the hub, and the one or more deformable members are all integrally fanned out of a single piece of material.

13. The measurement assembly of claim 12, wherein each deformable member includes a first end mounted to the outer toothed section and a second end mounted to the hub; and
wherein for each deformable member, rotation of the hub relative to the outer toothed section about the central axis causes the second end to move circumferentially toward the first end.

14. The measurement assembly of claim 13, wherein the disk further comprises one or more bearing assemblies mounted to one of the outer toothed section and the hub and each including a bushing configured to engage the other of the outer toothed section and the hub.

15. The measurement assembly of claim 14, wherein each of the bearing assemblies is mounted to the outer toothed section and the bushing of each bearing assembly is configured to engage the hub.

16. The measurement assembly of claim 11, wherein the first ring and the second ring each comprise a magnet including a first plurality of sections and a second plurality of sections circumferentially disposed about the central axis;
wherein each of the first plurality of sections is circumferentially disposed between a pair of the second plurality of sections and each of the second plurality of sections is circumferentially disposed between a pair of the first plurality of sections;
wherein each of the first plurality of sections has a first magnetic pole; and
wherein each of the second plurality of sections has a second magnetic pole that is opposite to the first magnetic pole.

17. The measurement assembly of claim 16, wherein the first ring and the second ring are disposed within a single plane extending perpendicularly through the central axis.

18. The measurement assembly of claim 11, wherein the first ring and the second ring each comprise a plurality of ferromagnetic teeth.

19. A measurement assembly comprising:
a disk including a plurality of teeth configured to be coupled to a motor such that the motor is configured to drive rotation of the disk about a central axis;
a first ring coupled to the disk;
a second ring coupled to a shaft;
wherein the first ring and the second ring each comprise a plurality of ferromagnetic teeth;
wherein the plurality of ferromagnetic teeth of the first magnetic ring and the plurality of ferromagnetic teeth of the second magnetic ring all extend through a single plane extending perpendicularly through the central axis;
a sensor unit configured to measure a rotational displacement of the ferromagnetic teeth of the first ring relative to the plurality of ferromagnetic teeth of the second ring about the central axis; and
one or more deformable members each formed as a substantially planar body that is planarly aligned with a plane normal to the central axis, each directly coupled at a first end to the disk, and each directly coupled at a second end to a ring member that is configured to rotate in a substantially fixed relationship with the shaft when the shaft is rotating in at least one direction, wherein rotation of the shaft relative to the disk about the central axis causes deformation of the one or more deformable members in the plane normal to the central axis.

20. The measurement assembly of claim 19, further comprising an air gap extending radially between the plurality of ferromagnetic teeth of the first ring and the plurality of ferromagnetic teeth of the second ring.

* * * * *